(12) United States Patent
Arakawa et al.

(10) Patent No.: US 6,908,655 B2
(45) Date of Patent: Jun. 21, 2005

(54) OPTICAL RECORDING MEDIUM

(75) Inventors: Nobuyuki Arakawa, Kanagawa (JP); Koji Ishihata, Ehime (JP)

(73) Assignees: Sony Corporation (JP); Teijin Chemicals Ltd. (JP)

(*) Notice: Subject to any disclaimer, the term of this patent is extended or adjusted under 35 U.S.C. 154(b) by 449 days.

(21) Appl. No.: 09/793,979

(22) Filed: Feb. 28, 2001

(65) Prior Publication Data

US 2001/0044004 A1 Nov. 22, 2001

(30) Foreign Application Priority Data

Mar. 3, 2000 (JP) .................................... P2000-063382

(51) Int. Cl.$^7$ .............................. B32B 3/00; G11B 3/70
(52) U.S. Cl. .................... 428/64.1; 428/64.4; 428/64.2; 428/65.1; 369/275.1
(58) Field of Search ...................... 369/275.1; 428/64.1, 428/64.4, 64.2, 65.1

(56) References Cited

FOREIGN PATENT DOCUMENTS

| EP | 262502 | 4/1988 |
| EP | 965985 | 12/1999 |
| WO | 144372 | 6/2001 |

OTHER PUBLICATIONS

Minister of International Trade and Industry, "Testing method for dynamic mechanical properties of plastics by non–resonant, forced, fixed frequency oscillation", Japanese Industrial Standard, Edition 1, K 7198—Oct. 2, 1991, pp. 1–11.

Minister of International Trade and Industry, "Testing method for dynamic mechanical properties of plastics by non–resonant, forced, fixed frequency oscillation", Japanese Industrial Standard, Edition 1, K 7198—Oct. 2, 1991, pp. 1–11, Japanese version.

International Standard 6721–1:2001, "Plastics—Determination of dynamic mechanical properties", Part 1: General Principles, Second Edition, May 15, 2001, pp. 1–20.

International Standard 6721–2:1994, "Plastics—Determination of dynamic mechanical properties", Part 2:Torsion–pendulum method, First Edition, Nov. 1, 1994, pp. 1–12.

International Standard 6721–3:1994, "Plastics—Determination of dynamic mechanical properties", Part 3:Flexural–vibration—resonance–curve method, First Edition, Nov. 1, 1994, pp. 1–10.

International Standard 6721–4:1994, "Plastics—Determination of dynamic mechanical properties", Part 4:Tensile–vibration—Non–resonance method, First Edition, Nov. 1, 1994, pp. 1–6.

International Standard 6721–5:1996, "Plastics—Determination of dynamic mechanical properties", Part 5:Flexural–vibration—Non–resonance method, First Edition, May 15, 1996, pp. 1–8.

International Standard 6721–6:1996, "Plastics—Determination of dynamic mechanical properties", Part 6:Shear vibration—Non–resonance method, First Edition, May 15, 1996, pp. 1–7.

International Standard 6721–7:1996, "Plastics—Determination of dynamic mechanical properties", Part 7:Torsional vibration—Non–resonance method, First Edition, Jun. 1, 1996, pp. 1–7.

International Standard 6721–8:1997, "Plastics—Determination of dynamic mechanical properties", Part 8:Longitudinal and shear vibration—Wave propagation method, First Edition, Jun. 1, 1997, pp. 1–17.

International Standard 6721–9:1997, "Plastics—Determination of dynamic mechanical properties", Part 9:Tensile vibration—Sonic–pulse propagation method, First Edition, Jun. 1, 1997, pp. 1–7.

International Standard 6721–10:1999, "Plastics—Determination of dynamic mechanical properties", Part 10:Complex shear viscosity using a parallel–plate oscillatory rheometer, Second Edition, Dec. 15, 1999, pp. 1–15.

Primary Examiner—Bruce H. Hess
Assistant Examiner—Lawrence Ferguson
(74) Attorney, Agent, or Firm—Rader, Fishman & Grauer PLLC; Ronald P. Kananen

(57) ABSTRACT

A disc-shaped recording medium having transcription characteristics for fine signals simultaneously with resonance characteristics and stiffness which are characteristics contrary to the transcription characteristics. At least a recording layer and a light transmitting layer are sequentially formed on a substrate and light is illuminated from a light transmitting layer side to record and/or reproduce information signals. The substrate includes a core layer formed of a resin composition comprised of a mixture of two or more resin sorts. The resin composition has tanδ, as an index indicating the internal loss, equal to not less than 0.015 as a system in its entirety. The resin composition constituting the core layer is a compounded resin of the incompatible system and is of an islands-sea structure.

12 Claims, 15 Drawing Sheets

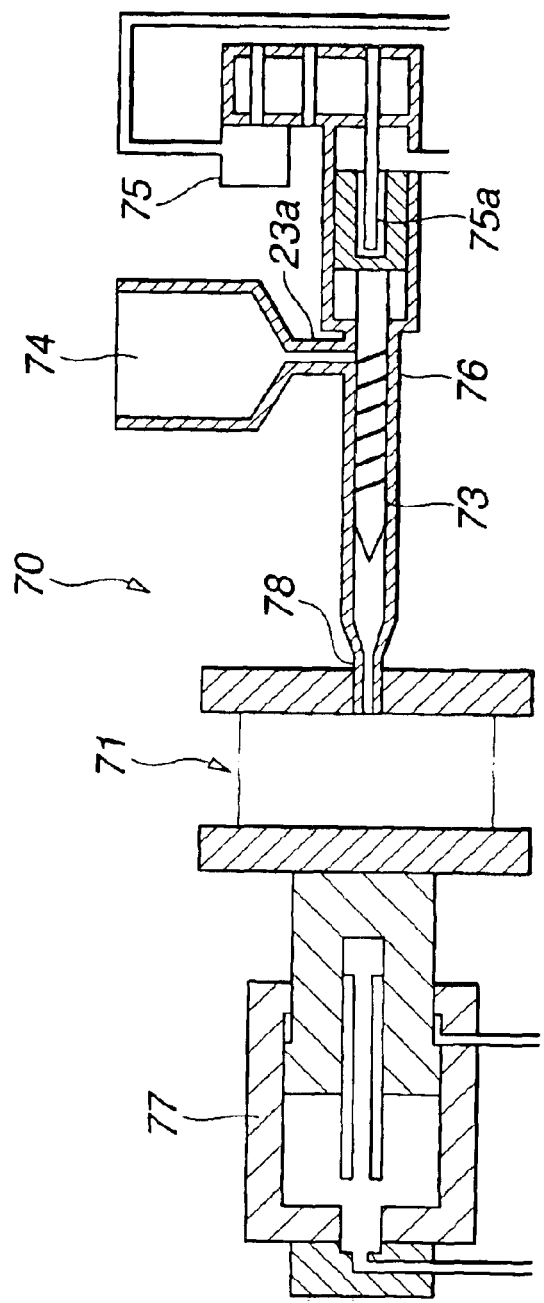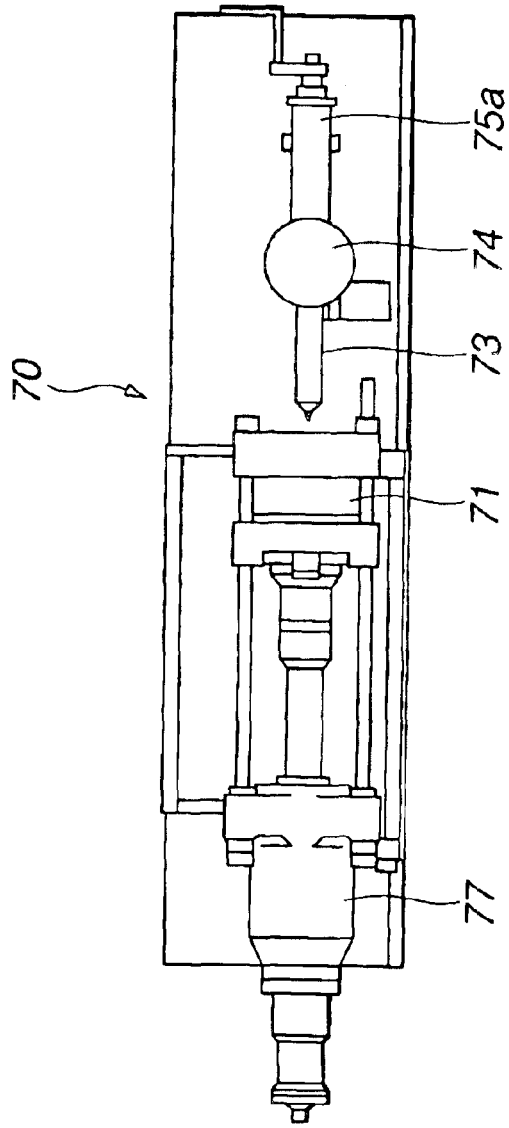
FIG. 7A
FIG. 7B

OPTICAL RECORDING MEDIUM

BACKGROUND OF THE INVENTION

1. Field of the Invention

This invention relates to a disc-shaped recording medium for recording a variety of information signals, such as speech or video signals.

2. Description of Related Art

Among the recording mediums for recording information signals, such as that for audio or video, there are known disc-shaped optical recording medium and a disc-shaped magnetic recording medium.

Among these recording mediums, there are an optical disc, on which information signals are written as micro-irregularities, such as by pits and grooves, a phase-change optical disc, a magneto-optical disc, exploiting photomagnetic effects of the recording film, and a hard disc for magnetically writing signals.

For forming a recording layer on an optical recording medium, among these recording mediums, having micro-irregularities, such as phase pits or pre-grooves, in association with information signals, such as data information or tracking servo signals, injection molding of a substrate of plastics material is routinely employed. Specifically, a disc-shaped substrate is formed using an injection molding device, a metal mold and a stamper, and information signals are transcribed at this time from the stamper.

Meanwhile, in a substrate of a conventional disc-shaped recording medium, such as a so-called digital audio disc (CD) or a digital versatile disc (DVD), referred to below as a disc substrate, in which the reproducing light is illuminated to pass through the bulk of the disc substrate to read out the information signals, the disc substrate is required to exhibit optical transparent characteristics and to be freed of birefringence to the maximum extent possible. In addition, the molding is required to be carried out with microscopic signal transfer characteristics.

In addition, since a flight head is used for recording and/or reproduction, a hard disc substrate is required to exhibit planarity close to that of glass, and hence it is necessary to use resin of high fluidity capable of transcribing signals in a state free from micro-protrusions.

For producing this disc substrate by injection molding, the crucial point is how to control a variety of internal stresses produced in the respective molding steps, including resin molding, injection charging into a metal mold or cooling for solidification, such as friction with the metal mold when the resin is injected and molded into the metal mold, a variety of stresses, pressure, temperature etc produced at the time of injection, or a variety of mechanical properties, such as defective transciption in the disc substrate, birefringence, deformation due to warping, or the like.

However, even if the internal loss of the substrate is increased to improve resonance characteristics and toughness of the disc substrate itself, it is difficult with the disc substrate of the conventional structure comprised of the uncompounded polymer to realize these properties simultaneously, since these properties are innate to the polymeric structure proper to the resin and cannot be coped with by the molding device or technique, and also because the high optical properties, large internal loss and high stiffness of the disc substrate are contradictory to one another.

With the tendency to higher recording density and especially to higher numerical aperture (NA), the light from the objective lens is throttled more severely than in the conventional CD or DVD, with the result that the recording and/or reproducing signal location is closer to the disc surface than to the disc bottom, with the tolerance for the warping or undulations of the disc substrate being decreased significantly.

This is evident from the following relation between the NA of the objective lens and the disc thickness and between the wavelength and NA:

$$f = D/2NA > WD$$

f: focal length of the lens

D: effective diameter of the objective lens;

NA: numerical aperture of the objective lens;

WD: operating distance of the objective lens $$\text{depth of focus} = \lambda/(NA)^2$$

$$\text{skew tolerance} \propto \lambda/(NA)^3$$

$$\text{thickness variation tolerance} \propto \lambda/(NA)^4$$

$$\text{disc toughness} \propto (\text{thickness})^3$$

From the above equation, the relation between NA and the disc thickness as the light transmitting layer may be found as follows:

For $NA=0.5$, the disc thickness=1.2 mm (CD)

For $NA=0.6$, the disc thickness=0.6 mm (DVD)

For $NA=0.75$, the disc thickness=0.3 mm

For $NA=0.85$, the disc thickness=0.1 mm.

In addition, there is a relation that the disc toughness is proportionate to the third power of the thickness, such that, as the disc becomes thinner in thickness with an increasing recording density, the disc becomes inferior in mechanical properties, such as bending strength. Moreover, under environment of heat, film stress, temperature or humidity, applied at the time of molding, the bimetallic deformation due to moisture absorption is liable to occur significantly in an optical recording medium adapted for recording on only one side, with the result that use of an optically transparent disc is virtually impossible.

Among the methods for molding a high NA high density disc substrate, there are a substrate molding method by two-color concurrent molding and a two-color core-back or core-rotating molding method employing a molding device having two injection units for molding two-layer structure or three-layer sandwich structure, with the use of a conventional optical resin having good fluidity for a skin layer and a resin having improved resonance characteristics or stiffness for a core layer.

However, the disc substrate having good signal transcription characteristics and stiffness cannot be realized with the use solely of a molding method or a molding device, since these properties are innate to the resin or to the resin composition. Thus, there is presented a demand for a resin composition satisfying these contrary characteristics, specifically the resin composition having good signal transcription properties and high stiffness.

SUMMARY OF THE INVENTION

It is therefore an object of the present invention to provide an optical recording medium in which transcription of fine signals, and high resonance characteristics and stiffness, as reciprocally contrary properties, can be realized simultaneously, thus assuring sufficient characteristics.

For accomplishing the above object, the present invention provides an optical recording medium in which at least a recording layer and a light transmitting layer are sequentially formed on a substrate and in which the light is illuminated from the light transmitting layer side for recording and/or reproducing information signals, wherein the substrate has at least a surface layer (skin layer) and a core layer, the core layer having an internal loss tanδ of not less than 0.015 as measured at 40° C. at 18 Hz pursuant to JIS K 7198.

For example, the core layer with an internal loss tanδ, comprised of the resin composition obtained on mixing two or more resin sorts, is excellent in resonance characteristics and in stiffness.

Thus, by forming this core layer as a core and by forming the surface layer by a resin layer having good transcription properties, transcription properties of fine signals can be compromised with the resonance characteristics and stiffness, which are characteristics contrary to the transcription properties.

According to the present invention, in which a substrate having a core layer with an internal loss tanδ of not less than 0.015 comprised of a resin composition, obtained on mixing two or more resins, is used, the transcription properties for fine signals can be compromised with resonance characteristics and stiffness, thus assuring sufficient properties as an optical disc.

BRIEF DESCRIPTION OF THE DRAWINGS

FIG. 7 consisting of FIGS. 7A and 7B, is a schematic view cross-sectional view and a schematic plan view schematically showing the structure of an injection molding device.

DESCRIPTION OF THE PREFERRED EMBODIMENTS

Figure 1:
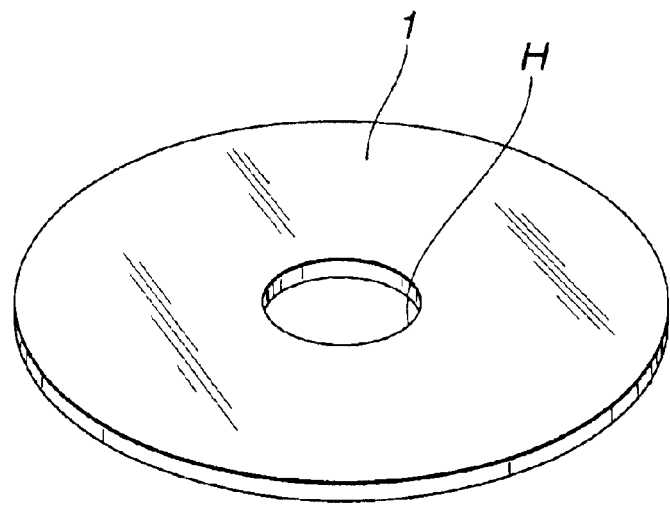
FIG. 1 is a schematic perspective view showing an example of an outer shape of an optical disc.

Referring to the drawings, preferred embodiments of an optical recording medium according to the present invention will be explained in detail.

The optical recording medium of the present invention has at least a recording layer and a light transmitting layer, sequentially formed on a substrate, with the substrate including a core layer formed of a resin composition comprising a mixture of two or more resins (so-called polymer alloy).

In particular, the two resins making up the resin composition are of a system of incompatibility maintain stiffness, while the resins of the incompatible system assume the islands-sea structure or a layered structure, thus leading to attenuation of vibrations as the vibrations pass through respective boundaries or layers to decrease the resonance generated at the time of high-speed disc rotation.

If suppression by the core layer of the resonance phenomenon produced on rotation of the optical recording medium is taken into consideration, tanδ, as an index indicating the internal loss of the entire system constituted by a resin composition obtained on mixing incompatible resins, is desirably not less than 0.015.

As for the resin composition, comprising two or more resins, resonance characteristics of the entire mixed system can be improved with a resin composition obtained on mixing into e.g., a polycarbonate resin, as a basic resin, such a resin which represents an incompatible system with respect to this basic resin.

Specifically, the resin composition may be composed of polycarbonate and acrylic resins. The acrylic resin has a flexural modulus of 3140 MPa higher than that of polycarbonate resin, which is 2250 MPa and an internal loss tanδ, as measured at 40° C. and 18 Hz pursuant to JIS K7198, being equal to 0.085, which is larger by a factor of 20 or more than that of the polycarbonate resin, which is 0.04. This mixture exhibits incompatibility and assumes an islands-sea structure or a layered structure and hence is useful in maintaining resonance characteristics and stiffness.

Although the acrylic resin has a water absorption coefficient of not less than 0.3% and thermal resistance as low as 100° C. at the maximum, so that it has been used only for a video disc (VD), the acrylic resin compounded with the polycarbonate resin imparts strength, thermal resistance and water absorption characteristics proper to the polycarbonate and stiffness and vibration damping characteristics proper to the acrylic resin.

The substrate, thus obtained, is improved in relative stiffness and thermal resistance depending on the mixing ratio of the respective resins, as a result of which not only the warping deformation at the time of manufacture may be suppressed but also the system margin is increased due to the reduced warping deformation on storage and in using environments.

In view of deformation due to water absorption, the substrate in its entirety or its surface layer is preferably formed of resin having the water absorption coefficient not higher than 0.20%.

This gives a disc substrate subjected to only small deformation due to water absorption and to only little disc deformation at warm humidity environment.

For example, the standard for the digital versatile disc (DVD), which is a high density information recording medium, provides for severe restrictions as to warping deformation of 0.4° or less which is severer than 0.6° for the CD. However, the high density disc substrate for coping with the high NA is in need of a standard for warping which is equivalent to or even severer than in the case of the DVD.

The DVD routinely uses s polycarbonate substrate with the water absorption coefficient on the order of 0.2%. However, since two discs each 0.6 mm in thickness are bonded together back-to-back with the signal sides thereof facing inwards. So, the DVD has a feature that water absorption is well-balanced, as long as the discs not exhibiting drastically different deformation characteristics are bonded together, and hence the deformation is not liable to occur even if the discs are of a high coefficient of water absorption.

The high density disc of the high NA (numerical aperture) suffers from a differential water absorption equilibrium because signals are on one side of the surface layer.

Among the materials used as surface layers, there are, for example, the polycarbonate resin and the acrylic resin, as uncompounded polymers, having superior signal transcription properties, with the water absorption coefficients of these materials being on the order of 0.2% or higher. If, in the above-mentioned DVD, the surface layer with the water absorption coefficient of 0.2% or higher is used, it is necessary to provide a skew absorption device on the recording and/or reproducing side in order to secure the skew margin as the system in its entirety.

Therefore, if, on the occasion of deformation due to water absorption, it is desired for the angle of warping deformation (radial skew angle) to be 0.4° or less, the water absorption coefficient preferably is to be 0.15% or less.

However, if the water absorption coefficient of the surface layer exceeds 0.2%, water absorption and removal occur on the disc surface under certain temperature and humidity conditions in concert with the stress produced in the disc recording side due to the formation of a recording film or a protective film thereon, thus giving rise to bimetallic deformation.

So, if the skin layer, as the superficial layer, is a resin layer with the water absorption coefficient of not higher than 0.2%, and the core layer is of a polymer or a polymer alloy, which is a resin composition having the water absorption coefficient of 0.2% or higher but exhibiting stiffness, thermal resistance or vibration-damping characteristics, it is possible to prevent deformation due to water absorption and to assure stiffness, thermal resistance and vibration-damping characteristics, desirable for a compounded substrate.

For producing the above-described disc substrate, it suffices if the skin layer resin and the core layer resin are injected from two injection units of a two-color molding device. Specifically, the skin layer is injected first and the core layer resin is sequentially injected when the skin layer is not solidified as yet. The resulting product may be taken out after cooling.

The core layer may also be added to with graphite powders superior in vibration damping characteristics to increase the internal loss further.

As for the graphite structure, a flaky crystal structure is preferred. For example, tan$\delta$ of a polycarbonate resin is 0.004. If graphite is added thereto in an amount of 10 wt %, the internal loss is increased by one order of magnitude to 0.018, such that, by combination with the uncompounded or compounded resin with large internal loss, the internal loss can be increased further.

The foregoing is the basic concept concerning the core layer. The resin composition used for the core layer will be explained in detail subsequently.

An optical recording medium, in particular an optical disc, is in need of a substrate material superior in stiffness and vibration damping characteristics, as discussed above.

As a material having superior vibration damping characteristics, there has been proposed a resin composition comprised of a thermoplastic resin added to with a vibration damping elastomer or specified whiskers. The resin composition, proposed so far, is not such as meets the vibration damping characteristics, low specific gravity and low warping of a molded product, required of the high density recording optical disc, in their entirety, to a sufficiently high level.

Among the resin compositions, sufficiently meeting these characteristics, there is a thermoplastic resin composition obtained on compounding a methyl methacrylate based resin in an amorphous thermoplastic resin of a specified tan$\delta$ having a heat distortion temperature not lower than a specific temperature. By employing such thermoplastic resin composition for the core layer, it is possible to realize a substrate which, while exhibiting superior vibration damping characteristics, is lightweight and superior in dimensional accuracy, stiffness and thermal resistance. This thermoplastic resin composition is hereinafter explained.

The thermoplastic resin composition is made up of 50 to 90 wt % of an amorphous thermoplastic resin (component A) which has an internal loss tan$\delta$ of 0.004 to 0.40 as measured at 40° C. and 18 Hz pursuant to JIS K7198 and a heat distortion temperature as measured under a load of 1.82 MPa pursuant to ASTM D648 of 120° C. or higher, and a methyl methacrylate resin (component B).

The above-mentioned resin composition is required to have the internal loss tan$\delta$ of 0.015 or higher, and is preferably of tan$\delta$ of 0.015 to 0.090, a water absorption coefficient as measured under a condition of immersion in water at 23° C. for 24 hours in water pursuant to ASTM D 570 of 0.20 wt % or less, a specific gravity as measured pursuant to JIS K7112 of 1.00 to 1.25, and a heat distortion temperature as measured under a load of 1.82 MPa pursuant to ASTM D 648 of 110 to 170° C.

Among representative aromatic polycarbonate resins, used as a component A, there is a polycarbonate resin containing at least 20 mol % per 100 mol % of the entire aromatic dihydroxy component of 1,1-bis(4-hydroxyphenyl)-3,3,5-trimethyl cyclohexane, referred to below as the bisphenol TMC, represented by the following formula:

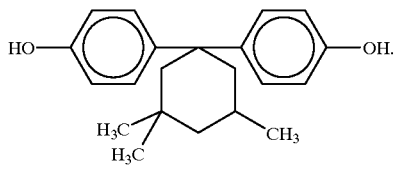

That is, the preferred aromatic polycarbonate resin uses at least 20 mol % and preferably 30 to 80 mol % of the aforementioned bisphenol TMC per 100 mol % of the total quantity of the aromatic dihydroxy component. If the content of the bisphenol TMC is not less than 20 mol %, it is possible to realize the high tanδ value, superior vibration damping characteristics, a low water absorption coefficient and a high dimensional stability. If the content of the bisphenol TMC is this high, preferably the terminal group is modified using a specified terminal group modifier as will be explained subsequently.

It is preferred that the aromatic polycarbonate resins use a constant proportion of the aforementioned bisphenol TMC as the aromatic dihydroxy component. Roughly, the following two means are used in order to realize desired properties, in particular the water absorption coefficient of 0.2 wt % or less and desirably 0.15 wt % or less. One of such means is to use a specified dihydroxy component to the aforementioned bisphenol TMC to give the copolycarbonate resin, while the other means is to introduce a terminal modifier of a specified structure to the terminal group. These two means may be used alone or in combination.

A copolycarbonate resin, obtained on combining the specified dihydroxy component with the aforementioned bisphenol TMC, is particularly suited as thermoplastic resin exhibiting vibration damping characteristics. That is, such copolycarbonate as contains at least 80 mol % per total amount of 100 mol % of the aromatic dihydroxy component of (a) bisphenol TMC (component a) and (b) at least one aromatic dihydroxy component selected from 4,4'-(m-phenylene diisopropylidene) diphenol, referred to below as bisphenol M, represented by the formula (2):

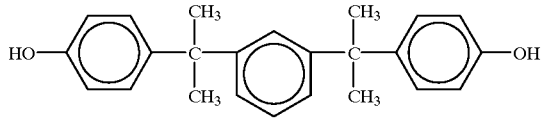

and 2,2-bis(3-methyl-4-hydroxyphenyl) propane, referred to below as bisphenol C, represented by the following formula (3):

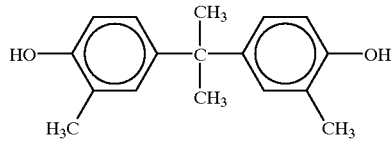

with the molar ratio of the component to the component (b) being 20:80 to 80:20, is particularly desirable as the component A.

One of the desirable modes of the copolycarbonate resin is such a mode in which the components (a) and (b) are bisphenol TMC and the bisphenol M, respectively, with the molar ratio of the bisphenol TMC to bisphenol M being 30:70 to 80:20 and particularly 40:60 to 70:30.

Another desirable mode is such a mode in which the components (a) and (b) are bisphenol TMC and the bisphenol M, with the molar ratio of the bisphenol TMC to bisphenol C being 30:70 to 80:20 and particularly 40:60 to 70:30.

In these desirable embodiments, the sum of the components (a) and (b) is advantageously at least 80 mol % and preferably at least 90 mol % in the total amount of 100 mol % of the aromatic dihydroxy components and typically a copolycarbonate resin substantially formed by the components (a) and (b).

On the other hand, in the aromatic polycarbonate resin desirably used as the component A, the above-mentioned components (a) and (b) desirably take up at least 80 mol % and preferably at least 90 mol % of the total amount of 100 mol % of the aromatic dihydroxy components. It is however possible for other dihydroxy components (component c) to be contained in an amount not larger than 20 mol % and desirably not larger than 10 mol % to the total amount of 100 mol % of the aromatic dihydroxy components.

It is sufficient if this component (c) is components other than the components (a) and (b) used as the dihydroxy components of the aromatic polycarbonate. The component (c) may, for example, be exemplified by hydroquinone, resorcinol, 4,4'-biphenol, 1,1-bis(4-hydroxyphenyl) ethane, 2,2-bis(4-hydroxyphenyl) propane, 2,2-bis(4-hydroxyphenyl) butane, 1,1-bis(4-hydroxyphenyl)-1-phenylethane, 1,1-bis(4-hydroxyphenyl) cyclohexane, 2,2-bis(4-hydroxyphenyl) pentane, 4,4'-(p-phenylene diisopropylidene) diphenol, 9,9-bis(4-hydroxyphenyl) fluorene, 1,1-bis(4-hydroxyphenyl) -4-isopropyl cyclohexane.

The aromatic polycarbonate resins may contain tri- or higher functional aromatic compounds or contain branched components in the polymer as a result of the isomerization reaction in polymerization. Examples of the tri- or higher functional aromatic compounds preferably include phlorogrucin, phlorogrucide, tris phenols, such as 4,6-dimethyl-2,4,6-tris(4-hydroxyphenyl) heptene-2,2,4,6-trimethyl-2,4,6-tris(4-hydroxyphenyl) heptane, 1,3,5-tris(4-hydroxyphenyl) benzene, 1,1,1-tris(4-hydroxyphenyl) ethane, 1,1,1-tris(3,5-dimethyl-4-hydroxyphenyl) ethane, 2,6-bis(2-hydroxy -5-methylbenzyl)-4-methyl phenol, and 4-(4-[1,1-bis(4-hydroxyphenyl) ethyl] benzene)-α,α-dimethylnbenzyl phenol, tetra(4-hydroxyphenyl) methane, bis(2,4-dihydroxyphenyl) ketone, 1,4-bis(4,4-dihydroxytriphenyl methyl) benzene, trimellitic acid, pyromellitic acid, benzophenone tetracarboxylic acid and acid chlorites thereof. Of these, 1,1,1-tris(4-hydroxyphenyl) ethane and 1,1,1-tris(3,5-dimethyl-4-hydroxyphenyl) ethane, are preferred, and in particular, 1,1,1-tris(4-hydroxyphenyl) ethane is preferred.

The aromatic polycarbonate resin, used as the thermoplastic resin, is prepared by reaction means known per se in the preparation of general aromatic polycarbonate resins, such as a method of reacting a carbonate precursor, such as phosgene or carbonic acid diesters, with aromatic dihydroxy components. In the following, basic means for these manufacturing methods are explained only briefly.

The reaction by a solution method is usually a reaction between dihydricphenol and phosgene, and is usually carried out in the presence of an acid coupling agent and an organic solvent. As the acid coupling agent, alkali metal hydroxides, such as sodium hydroxide or potassium hydroxide, or amine compounds, such as pyridine, are used. As the organic solvent, halogenated hydrocarbons, such as methylene chloride or chlorobenzene, are used. For accelerating the reaction, a catalyst such as tertiary amines, quaternary ammonium compounds or quaternary phosphonium compounds which are exemplified by triethylamine, tetra-n-butylammonium bromide, or tetra-n-butylphosphonium bromide respectively may also be used. Preferably, the reaction temperature is routinely 0 to 40° C., with the reaction time being 10 minutes to 5 hours and with the pH during the reaction being not less than 9.

In the polymerization reaction, terminal capping agents are usually employed. These terminal capping agents used may be monofunctional phenols. These monofunctional phenols are routinely used as the terminal capping agents for adjusting the molecular weight. The polycarbonate resin obtained has its terminal capped by a monofunctional phenol based group so that it is superior in thermal stability to polycarbonate resin not obtained as described above. The monofunctional phenols are generally phenols or lower alkyl substituted phenols and may be exemplified by the monofunctional phenols represented by the following general formula (4):

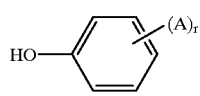

(4)

where A is a hydrogen atom, C1 to C9 straight-chained or branched alkyl or phenyl-substituted alkyl groups, r is an integer from 1 to 5 and desirably 1 to 3.

Specified examples of the monofunctional phenols include phenol, p-tert-butylphenol, p-cumylphenol and isooctylphenol.

Other examples of the monofunctional phenols include phenols or benzoic acid chlorides, having long-chain alkyl or aliphatic polyester groups as substituents, or long-chain alkyl carboxylic acid chlorides. Of these, phenols having long-chain alkyl groups represented by the following general formulas (5) and (6):

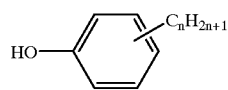

(5)

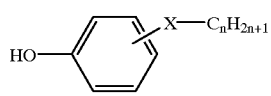

(6)

wherein X is —R—O—, —R—CO—O— or —R—O—CO—, R being a single bond or C1–C10 and preferably C1–5 bivalent aliphatic hydrocarbon groups, n being an integer of 10 to 50, are preferred.

As the substituted phenols, represented by the general formula (5), those with n of 10 to 30 and particularly 10 to 26 are preferred. Specified examples of the substituted phenols include decyl phenol, dodecyl phenol, hexadecyl phenol, octadecyl phenol, eicosyl phenol, docosyl phenol and triacontyl phenol.

As the substituted phenols, represented by the general formula (6), those in which X is —R—CO—O— and R is a single bond, n being 10 to 30 and in particular 10 to 26, are desirable. Examples of the substituted phenols include decyl hydroxy benzoate, dodecyl hydroxy benzoate, tetradecyl hydroxy benzoate, eicosyl hydroxy benzoate, docosyl hydroxy benzoate and triaconytil benzoate.

The terminal capping agent is introduced in an amount of at least 5 mol % and preferably at least 10 mol % to the total terminal groups of the polycarbonate resin produced. More preferably, the terminal capping agent is introduced in an amount of 80 mol % or more to the total terminal groups, so that the terminal hydroxy groups (OH groups) derived from the dihydric phenols are 20 mol % or less. Most preferably, 90 mol % or more of the terminal capping agent is introduced to the total amount of the terminal groups, that is, the amount of the OH groups is 10 mol % or less. The terminal capping agent may be used alone or in combination.

The reaction by the melting method is usually an ester exchange reaction between a dihydric phenol and a carbonate ester, and is carried out by a method consisting in mixing the dihydric phenol and the carbonate ester in the presence of an inert gas under heating and in distilling off the generated alcohol or phenol. Although the reaction temperature differs with e.g., the boiling point of the generated alcohol or phenol, it is usually 120 to 350° C. During the latter half of the reaction, the reaction system is reduced in pressure to approximately $1.33 \times 10^3$ to 13.3 Pa to facilitate distillation of the generated alcohol or phenol. The reaction time is usually 1 to 4 hours.

Among the carbonate esters, there are esters, such as C6 to C10 aryl groups or aralkyl groups or C1–4 alkyl groups, that may occasionally be substituted, specifically, diphenyl carbonate, bis(chlorophenyl) carbonate, dinaphtyl carbonate, bis(diphenyl) carbonate, dimethyl carbonate, diethyl carbonate and dibutyl carbonate. Of these, diphenyl carbonate is most preferred.

For accelerating the polymerization, polymerization catalysts may also be used. As these polymerization catalysts, those catalysts routinely used for esterification or ester exchange reactions, such as alkali metal compounds, e.g., sodium hydroxide, potassium hydroxide, or sodium or potassium salts of dihydric phenols, alkali earth metal compounds, such as calcium hydroxide, barium hydroxide or magnesium hydroxide, nitrogen-containing basic compounds, such as tetramethyl ammonium hydroxide, tetraethyl ammonium hydroxide, trimethylamine or triethylamine, alkoxides of alkali metals or alkali earth metals, organic acid salts of alkali metals or alkali earth metals, zinc compounds, boron compounds, aluminum compounds, silicon compounds, germanium compounds, organotin compounds, lead compounds, osmium compounds, antimony compounds, manganese compounds, titanium compounds or zirconium compounds, may be used. These catalysts may be used alone or in combination. These catalysts are used in an amount preferably of $1 \times 10^{-8}$ to $1 \times 10^{-3}$ equivalent, more preferably $1 \times 10^{-7}$ to $5 \times 10^{-4}$ equivalent, to one mol of the dihydric phenol as the starting material.

In the above-described polymerization reaction, compounds such as bis (chlorophenyl) carbonate, bis (bromophenyl) carbonate, bis (nitrophenyl) carbonate, bis (phenylphenyl) carbonate, chlorophenyl phenyl carbonate, bromophenyl phenyl carbonate, nitrophenyl phenyl carbonate, phenylphenyl carbonate, methoxycarbonylphenyl phenyl carbonate or ethoxycarbonylphenyl phenyl carbonate, are preferably added at the latter period or on termination of the polycondensation reaction, for decreasing the amount of the phenolic terminal groups. Of these, 2-chlorophenyl phenyl carbonate, 2-methoxycarbonylphenyl phenyl carbonate and 2-ethoxycarbonylphenyl phenyl carbonate, are preferably used. In particular, 2-methoxycarbonylphenyl phenyl carbonate is preferred.

In consideration of the layered structure of the methyl methacrylate based resin in the thermoplastic resin exhibiting vibration damping characteristics, the molecular weight of the polycarbonate resin in terms of the viscosity average molecular weight (M) is preferably 10,000 to 50,000, more preferably 13,000 to 30,000 and most preferably 13,500 to 20,000. The viscosity average molecular weight is found by substituting the specific viscosity ($\eta_{SP}$) as found from a solution obtained on dissolving 0.7 g of the polycarbonate resin in 100 ml of methylene chloride at 20° C. into the following equation:

$$\eta_{SP}/c = [\eta] + 0.45 \times [\eta]^2 c$$

[$\eta$] (ultimate viscosity)=$1.23 \times 10^{-4} M^{0.83}$ c=0.7 where [$\eta$] is ultimate viscosity.

If the viscosity average molecular weight is less than 10,000, the strength falls short, whereas, if it exceeds 50,000, dispersion of the methyl methacrylate resin is insufficient, such that a sufficient layered structure effective for vibration damping characteristics cannot be formed.

The starting polycarbonate resin material is manufactured by any known manufacturing method, such as solution polymerization or melting polymerization method, after which impurities such as low molecular weight components or non-reacted components or impurities are preferably removed by fine filtering in a solution state or by rinsing the granulated particulate material freed of solvents in a poor solvent, such as acetone, under e.g., a heating condition. In an extrusion step (pelletizing process), for producing the pellet-like polycarbonate resin, the resin in the melted state is preferably passed through a sintered metal filter with a filtering mesh size of 10 μm to remove impurities.

The methyl methacrylate based resin, used as the component B, is comprised mainly of methyl methacrylate, and is a polymer or a copolymer of methyl methacrylate. Examples of copolymer components of these copolymers include acrylic acid alkylesters, such as methyl acrylate, ethyl acrylate, propyl acrylate, isopropyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, and benzyl acrylate, methacrylic acid alkylesters, such as ethyl methacrylate, propyl methacrylate, isopropyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, and benzyl methacrylate, and copolymers thereof. One or more of these polymers or copolymers may also be used.

The proportion of the methyl methacrylate component in the methyl methacrylate resin is 80 wt % or more and preferably 90wt % or more to 100 wt % of the methyl methacrylate resin. As the copolymer component, methyl acrylate is preferably used.

Meanwhile, the methyl methacrylate resin preferably has a heat distortion temperature as measured under a load of 1.82 MPa pursuant to ASTM D 648 of 80° C. or higher. If this condition of the heat distortion temperature is met, such a vibration damping thermoplastic resin composition may be produced which exhibits optimum equilibrium between the vibration damping characteristics and thermal resistance.

In the B component, it is also possible to use a methyl methacrylate resin composition admixed with an acrylic resilient material.

The acrylic resilient material is composed of acrylate rubber components as essential components, methyl methacrylate, alkyl acrylates, with C1 to C8 alkyl groups, and vinyl monomers copolymerizable therewith, as necessary, as copolymer components. In such acrylic resilient material, the amount of methyl methacrylate is 15 to 65 wt % in 100 wt % of the resilient material. It is desirable to add styrene in the composition since styrene achieves the refractive index closer to that of methyl methacrylate resin to improve total light transmittance.

The acrylate rubber contains C2 to C10 alkyl acrylate and, as components copolymerizable therewith, styrene, methyl methacrylate or butadiene, as necessary.

As C2 to C10 alkyl acrylate, 2-ethyl hexylacrylate and n-butylacrylate is preferred. This alkyl acrylate is preferably contained in an amount of 50 wt % in 100 wt % of the acrylate rubber. Also preferably, the acrylate rubber is cross-linked at least partially. The cross-linkage agents used for cross-linking may, for example, be enumerated by ethylene glycol diacrylate, butylene glycol diacrylate, ethylene glycol dimethacrylate, allyl methacrylate and polypropylene glycol diacrylate. Preferably, 0.01 to 3 wt % of these cross-linking agents are used in the acrylate rubber.

As a preferred form of the acrylic resilient material, it may preferably be a core shell structure and a multi-layered structure obtained on polymerizing the acrylate rubber component, methyl methacrylate, alkyl acrylate with C1 to C8 alkyl groups, styrene and vinyl monomers copolymerizable therewith, in multiple layers, as necessary. This acrylic resilient material may be prepared by any known methods, such as block polymerization, suspension polymerization, block-suspension polymerization, solution polymerization or emulsion polymerization. The multi-layered structure may also contain a component not grafted on the graft base in multi-stage polymerization.

Among these acrylic resilient materials, a plate-shaped molded product of an acrylic resilient material formed of a resin composition containing 10 wt % of the acrylic resilient material, containing in turn a polymethyl methacrylate resin, with a thickness of 2 mm, with a total light transmittance in an atmosphere of 23° C. and a relative humidity of 50% being 85% or higher, may preferably be used. More preferably, the total light transmittance is 85% or higher, with the haze value as measured under the same condition being 7% or lower.

Among the methyl methacrylate based resins, containing these acrylic resilient materials, certain marketed products, such as those manufactured and sold by ASAHI KASEI CORPORATION under a trade name of DELPET SR series, a product manufactured and sold by MITSUBISHI RAYON CO., LTD., under a trade name of ACRYPET IR series, and a product manufactured and sold by SUMITOMO CHEMICAL CO., LTD., under the trade name of SUMIPEX HT series, are desirable.

The proportion of the methyl methacrylate based resin, as a component B, is 10 to 50 wt %, preferably 15 to 40 wt % and more preferably 20 to 35 wt % in a sum total of 100 wt % of the components A and B. If the proportion of the component B is less than 10 wt %, vibration damping characteristics fall short, whereas, if it exceeds 50 wt %, thermal resistance and low water absorption characteristics fall short. The aforementioned thermoplastic resin composition, composed mainly of the aforementioned components A and B, satisfy the following variable characteristics.

In the above-mentioned thermoplastic resin composition, exhibiting vibration damping characteristics, tanδ as measured at 40° C. and 18 Hz pursuant to JIS K 7198 needs to be 0.015 or higher, preferably 0.015 to 0.090 and more preferably 0.050 to 0.070. If tanδ is less than 0.015, the vibration damping characteristics fall short, whereas, if it exceeds 0.090, dimensional accuracy tends to fall short.

The water absorption coefficient of the thermoplastic resin composition, exhibiting vibration damping characteristics, as measured under the condition of immersion in water at 23° C. for 24 hours pursuant to ASTM D 570, needs to be 0.30 wt % or lower and desirably 0.2 wt % or lower. If the water absorption coefficient exceeds 0.30 wt % the dimensional accuracy achieved is not optimum. It is noted that, if the component A is an aromatic polycarbonate resin, the value of 0.08wt % may be indicated as a measure of the lower limit value.

The specific gravity of the aforementioned thermoplastic resin composition, as measured under JIS K 7112, needs to be 1.00 to 1.25 and preferably 1.00 to 1.20. If the specific gravity exceeds 1.25, the lightness in weight is not up to the required level.

In addition, the heat distortion temperature of the thermoplastic resin composition, as measured under a load of 1.82 MPa pursuant to ASTM D 648, needs to be 110 to 170° C. and preferably 120 to 160° C. If the temperature is lower than 110° C., thermal resistance falls short, whereas, if the temperature exceeds 170° C., an elevated temperature is required in molding, thus undesirably producing thermal deterioration in the component B used in accordance with the present invention.

In the above-mentioned resin composition, a variety of fillers, for example, plate-shaped fillers, need to be added as the component (c) for improving stiffness and vibration damping characteristics. The plate-shaped filler may be enumerated by glass flakes, mica, metallic flakes and graphitic fillers. The mean particle size of the plate-shaped filler is preferably 10 to 700 μm, more preferably 10 to 600 μm and most preferably 10 to 400 μm. This mean particle size is calculated as a median diameter of the weight distribution of the particle size as found by a standard mesh sieve in accordance with the standard sifting method. If the mean particle size is within this range, it is possible to realize a more desirable equilibrium between the vibration damping characteristics and filler dispersibility.

In preparing the thermoplastic resin composition, exhibiting vibration damping characteristics the value of the mean particle size tends to be decreased due to crack of the plate-shaped filler in case the mean particle size exceeds 100 μm. However, even in such case, it is possible to realize characteristics exhibiting well-balanced dispersibility and vibration damping characteristics.

Among these C components, graphitic fillers are most preferred in view of low specific gravity and vibration damping characteristics. As the graphitic fillers, naturally produced earthen graphite or flaky graphite may be used. In addition, artificial graphite, obtained on crystallizing amorphous carbon produced from coal, petroleum or coke, may also be used. The mean particle size of the graphite is preferably 10 to 600 μm and more preferably 10 to 400 μm.

The amount of addition of the component C is preferably 5 to 15 wt % based on the weight of the resin composition. Within this range, more desirable vibration damping characteristics and stiffness and lower specific gravity may be achieved at a higher level.

The thermoplastic resin composition of the present invention may be added to with phosphorus-based thermal stabilizers, as necessary. The phosphorus-based thermal stabilizers may be enumerated by, for example, phosphorous acid, phosphoric acid, phosphonous acid, phosphonic acid and esters thereof. Specifically, phosphite compounds, such as triphenyl phosphite, tris nonylphenyl phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl) pentaerythritol diphosphite, 2,2-methylenebis(4,6-di-tert-butylphenyl) octyl phosphite, bis (nonylphenyl) pentaerythritol diphosphite and bis(2,4-di-tert-butylphenyl) pentaerythritol, and phosphate compounds, such as tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxy ethyl phosphate, dibutyl phosphate and diisopropyl phosphate, may be indicated. As other phosphorus-based thermal stabilizers, phosphate compounds, such as tetrakis (2,4-di-tert-butylphenyl)-4,4'-biphenylene diphosphonite, tetrakis(2,4-di-tert-butylphenyl)-3,3'-biphenylene diphosphonite and bis(2,4-di-tert-butylphenyl)-4-biphenylene phosphonite, may be indicated. Of these, tris nonylphenylphosphonite, distearyl pentaerythritol diphosphite, bis(2,4-di-tert-butylphenyl) pentaerythritol disphosphite, tris(2,4-di-tert-butylphenyl) phosphite, triphenyl phosphate, trimethyl phosphate, tetrakis(2,4-di-tert-butylphenyl)-4,4'-biphenylene diphosphonite and bis(2,4-di-tert-butylphenyl)-4-biphenylene phosphonite, are preferred. These thermal stabilizers may be used alone or as a mixture. The amount of these thermal stabilizers is preferably 0.0001 to 0.5 weight part, more preferably 0.0005 to 0.2 weight part and most preferably 0.002 to 0.2 weight part to 100 weight parts of the thermoplastic resin composition exhibiting vibration damping characteristics.

The thermoplastic resin composition exhibiting vibration damping characteristics may be added to with known antioxidants for preventing oxidation, exemplified by phenolic antioxidants. Examples of these antioxidants include triethylene glycol-bis(3-(3-tert-butyl-5-methyl-4-hydroxyphenyl) propionate), 1,6-hexanediol-bis(3-(3,5-di-tert-butyl-4-hydroxyphenyl) propionate, pentaerythritol-tetrakis(3-(3,5-di-tert-butyl-4-hydroxyphenyl) propionate), octadecyl-3-(3, 5-di-tert-butyl-4-hydroxyphenyl) propionate, 1,3,5-trimethyl-2,4,6-tris(3,5-di-tert-butyl-4-hydroxybenzyl) benzene, N,N-hexamethylene-bis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl) isocyanurate, 3,9-bis{1,1-dimethyl-2-[β-(3-tert-butyl-4-hydroxy-5-methylphenyl)propionyloxy]ethyl}-2,4,8,10-tetraoxaspiro(5,5) undecane. Preferably, these antioxidants are added in an amount of 0.0001 to 0.5 weight part to 100 weight parts of the resin component of the thermoplastic resin composition exhibiting vibration damping characteristics.

The thermoplastic resin composition exhibiting vibration damping characteristics may also be added to with a higher fatty acid ester of a polyhydric alcohol as necessary. By such addition of the higher fatty acid ester, not only the thermal stability of the thermoplastic resin and the fluidity of the resin being molded but also the mold release properties of the substrate from the metal mold may be improved. This higher fatty acid ester is preferably a partial ester or whole ester of C2 to C5 polyhydric alcohols with C10 to C30 saturated fatty acids. As the polyhydric alcohol, glycol, glycerol or pentaerythritol is indicated.

The higher fatty acid ester is added in a range preferably of 0.005 to 2 weight parts and more preferably of 0.02 to 0.1 weight part to 100 weight parts of the resin component of the thermoplastic resin composition exhibiting vibration damping characteristics. With the addition amount of 0.005 to 2 weight parts, the aforementioned effect may be achieved without contaminating metal molds.

Moreover, the thermoplastic resin composition may be added to with inorganic fillers, such as glass fibers, carbon fibers, milled fibers, wollastonite whiskers, carbon black, silica particles, titanium oxide particles and alumina particles, heat-resistant organic fillers, such as aramid fibers, polyarylate fibers, polybenzothiazole fibers and aramide powders, halogen-based flame retardants, phosphorus-based flame retardants, such as phosphate, phosphate oligomers and red phosphorus, silicone-based flame retardants, anti-drip agents, such as fibrillated fluorine resins, lubricating agents, such, as silicone compounds, fluorine compounds polyolefin wax, and additives, such as photostabilizers, colorants, anti-electrification agents or fluidity improvers, in a range not affecting the characteristics. It is also possible to add other thermoplastic resins in an amount not affecting the object of the invention.

The thermoplastic resin composition exhibiting vibration damping characteristics may be prepared by mixing respective components of the thermoplastic resin composition exhibiting vibration damping characteristics by a kneader, such as a tumbler, V-blender, Nauta mixer, Banbury mixer, kneader roll or an extruder. More preferably, the respective components are melted and kneaded together by an extruder, in particular a twin-screw extruder.

The thermoplastic resin composition exhibiting vibration damping characteristics, thus obtained, may be subjected to extrusion molding, injection molding, compression molding, blow molding or to vacuum molding to prepare a component part (core layer) which is lightweight and which is superior in dimensional accuracy, stiffness, thermal resistance and vibration damping characteristics.

Of these, injection molding is most preferred for manufacturing the composition. In such case, the composition may be prepared not only by a usual cold runner type molding method, but by a hot runner enabling a runnerless process. In the injection molding, the routine molding method which allows for forming two layers, such as sandwich molding, may not only be used alone, but also in combination with a variety of molding methods, such as gas assisted injection molding, injection compression molding, high speed injection molding, two-color molding or insert molding.

A specified structure of an optical recording medium embodying the present invention is hereinafter explained.

FIG. 1 shows a specified illustrative shape of an optical disc 1 embodying the present invention. Similarly to a routine optical disc, the optical disc 1 has a center hole H.

Figure 2:
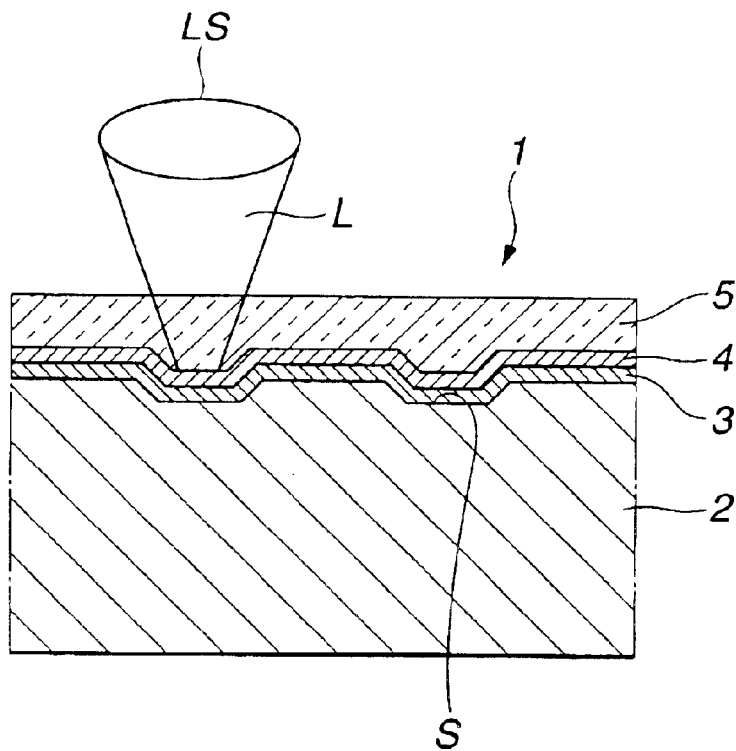
FIG. 2 is a schematic view cross-sectional view showing a basic structure of the cross-section of a high density optical disc.

FIG. 2 shows a typical cross-sectional structure of a high density optical disc adapted for recording and/or reproduction of information signals by illuminating light from the recording layer side instead of by illuminating the light through the substrate for recording and/or reproducing information signals.

Among the disc-shaped recording mediums, for example, the optical recording medium for recording the information for audio or video or other various information, there are a variety of optical information recording mediums for recording or reproducing information signals by light illumination.

Among the disc-shaped information recording mediums, there are a so-called Compact Disc (CD), a rewritable disc, such as a magneto-optical disc and a phase-change disc. In the information recording layer of the disc-shaped recording medium, it is necessary to form a pattern sequence of fine crests and recesses, such as pits or pre-grooves, in order to permit recording of information data, tracking servo signals, and so on.

The same holds for a high-density optical disc 1 shown in FIG. 2, in which an information signal recording surface S having crests and grooves is formed on a substrate 2 and a light reflecting layer 3, a recording layer 4 and a light transmitting layer 5 are layered on this signal recording surface S.

In the optical disc 1 of FIGS. 1 and 2, the laser light L is illuminated from the light transmitting layer 5 of the optical disc 1 of FIGS. 1 and 2 to read out or record information signals.

The laser light L, emanating from the lens LS, is illuminated on the signal recording surface S in the form of crests and grooves, by passing through the light transmitting layer 5 and the recording layer 4, so as to be then reflected by the light reflecting layer 3 towards the lens as return light.

The optical disc of the routine structure is similar in structure to that shown in FIG. 2, however, it is illuminated by the laser light L through a substrate (light transmitting layer) 51, which is optically transparent and relatively free from birefringence, to record and/or reproduce the information signals S.

The light reflecting layer 53 and the recording layer 52 are reversed in structure to those shown in FIG. 2. That is, a layer 54 equivalent to the light transmitting layer 5 of the optical disc shown in FIG. 2 performs the function as a protective layer for the recording film and is not in need of being optically transparent. In general, a UV light curable resin layer a few $\mu$m in thickness is used as the layer 54.

Figure 4:
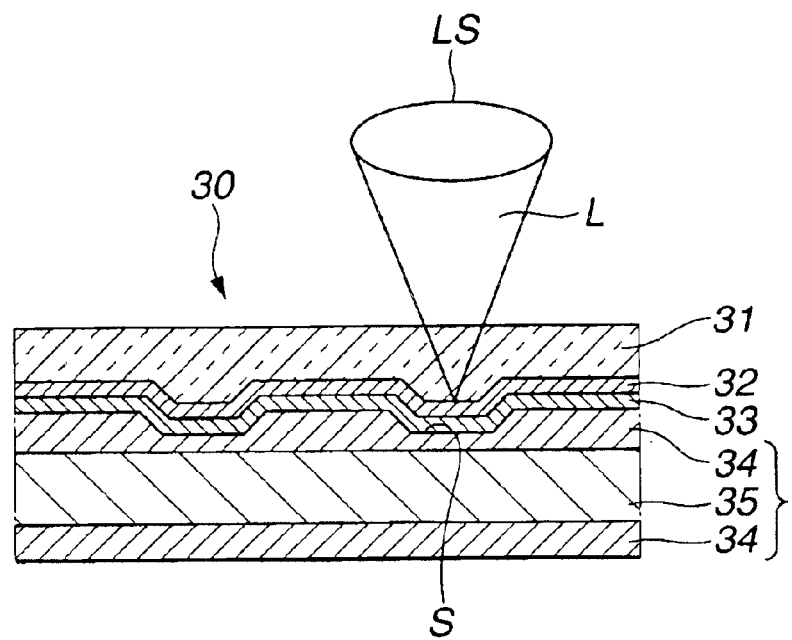
FIG. 4 is a schematic cross-sectional view showing a substrate having a three-layer structure.

FIG. 4 shows an illustrative cross-sectional structure of the optical disc 30 having a substrate including a core layer 35 both sides of which are coated with a skin layer 34.

The core layer 35 and the skin layer 34 are preferably formed of a self-adherent material. The thickness of the skin layer 34 is preferably not less than 50 $\mu$m. If the thickness of the skin layer 34 is less than 50 $\mu$m, not only is injection molding rendered difficult but also the problem of surface characteristics presents itself.

The structure is otherwise the same as that shown in FIG. 2. That is, a light reflecting layer 33, a recording layer 32 and a light transmitting layer 31 are layered sequentially on the skin layer 34, with the recording and/or reproducing light being illuminated from the side of the light transmitting layer 31.

Figure 5:
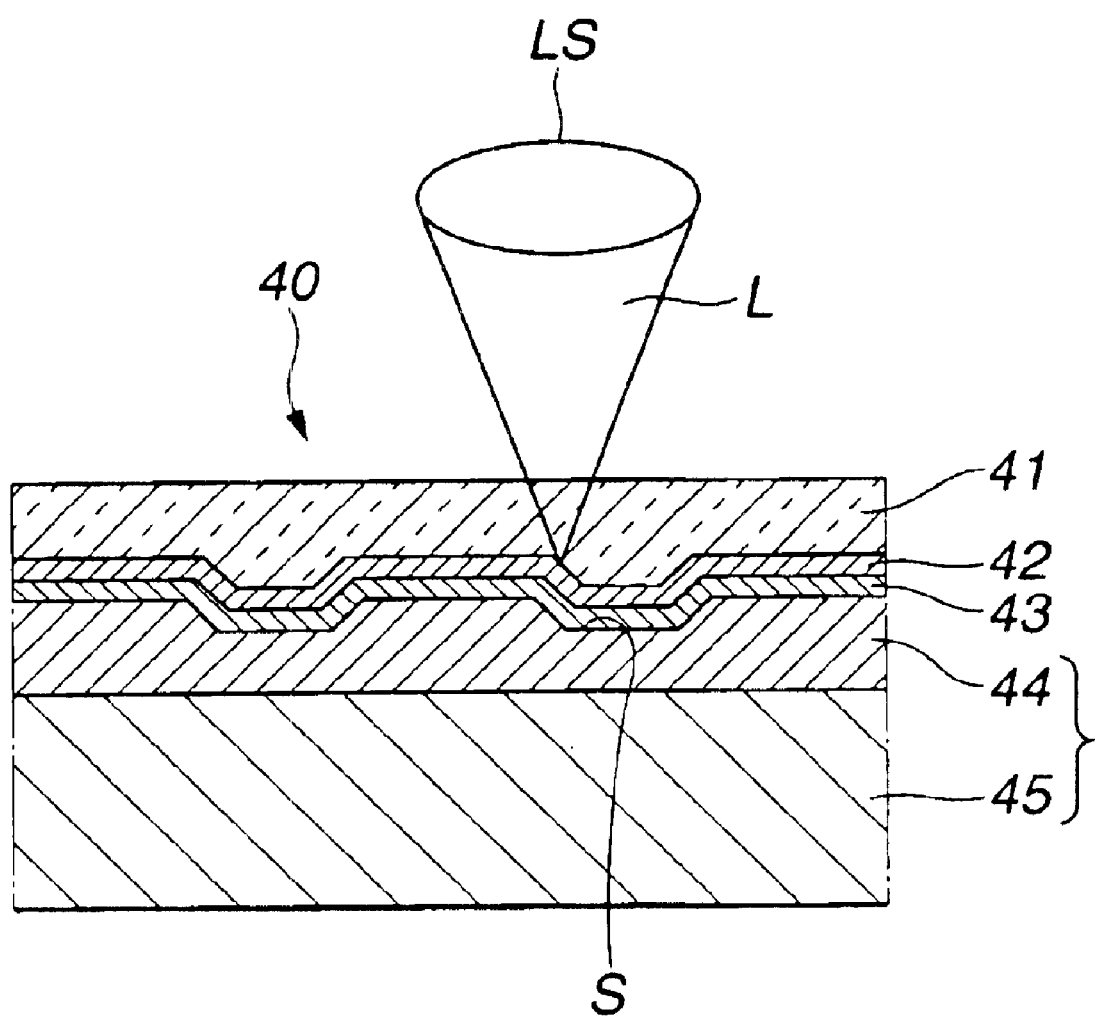
FIG. 5 is a schematic view cross-sectional view of an optical disc having a substrate of a two-layer structure.

FIG. 5 shows another typical cross-sectional structure of an optical disc 40 embodying the present invention. In the present embodiment, the substrate has a dual structure comprising a core layer 45 and a skin layer 44.

Here again, the structure is otherwise the same as that shown in FIG. 2. That is, a light reflecting layer 43, a recording layer 42 and a light transmitting layer 41 are layered sequentially on the skin layer 44, with the recording and/or reproducing light being illuminated from the side of the light transmitting layer 41.

Figure 6:
FIG. 6 is a schematic view showing an islands-sea structure.

In these optical discs 30 and 40, the core layers 35, 45, making up the substrate, are formed of a resin composition, as discussed previously. As shown schematically in FIG. 6, the resin components A, B, incompatible to each other, are intertwined to form a so-called islands-sea structure.

Referring to FIGS. 7 to 10, a molding device and a metal mold for producing the optical disc substrate shown in FIG. 4 is explained.

FIG. 7 shows a basic structure of a disc molding device 70. FIG. 7A is a schematic view cross-sectional view of the disc molding device 70, and FIG. 7B is a schematic plan view of the disc molding device 70. Referring to FIGS. 7A and 7B, the molding device 70 has a metal mold unit 71 and an injection unit 73. Partway in the injection unit 73 is arranged a hopper 74, whilst the metal mold unit 71 is arranged in register with a nozzle 78 and may be opened and closed by actuating a piston by a mold clamping cylinder 77.

Figure 8:
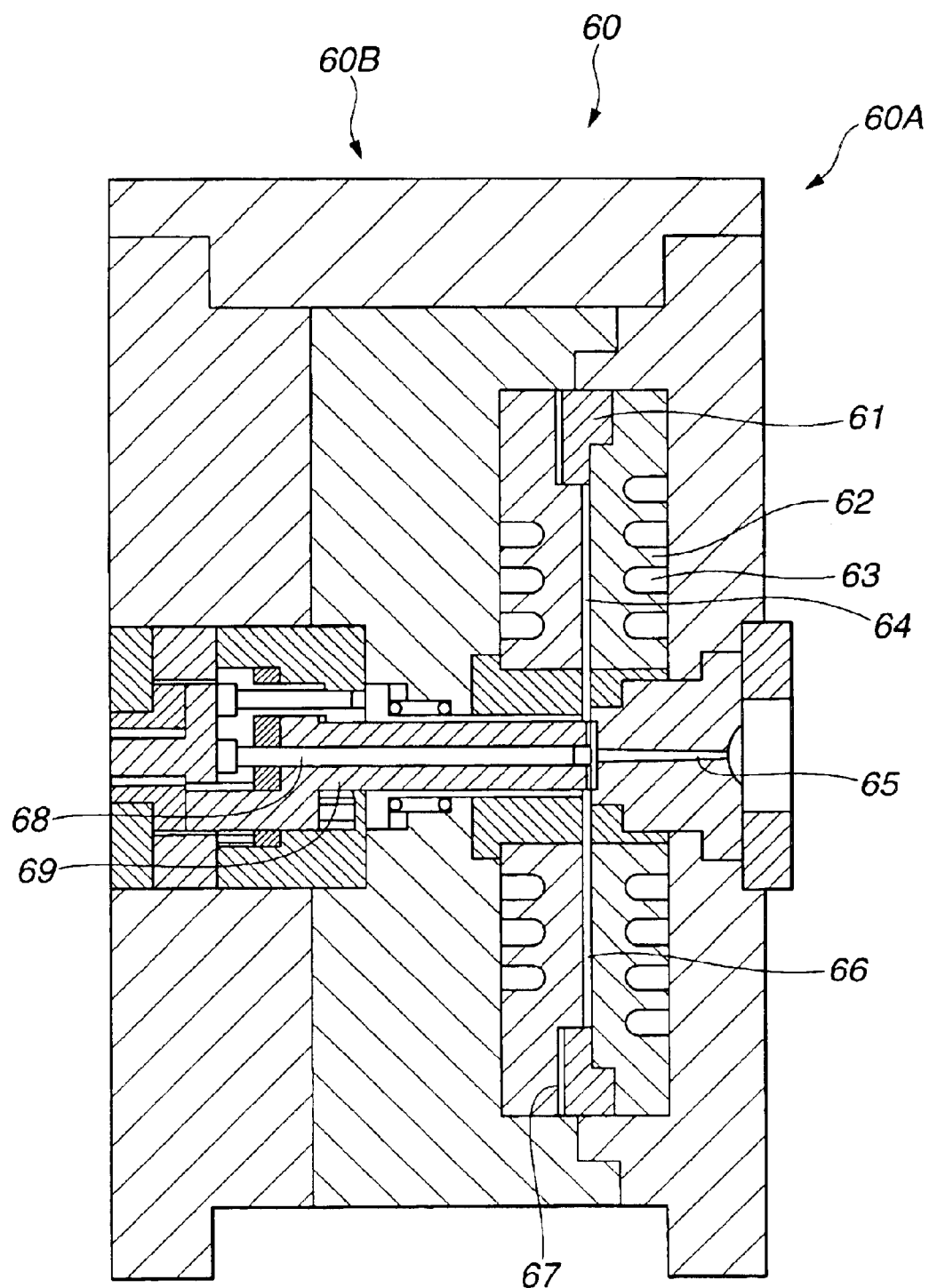
FIG. 8 is a schematic view cross-sectional view showing a metal mold portion.

Referring to FIG. 8, showing the structure of the metal mold unit 71, the metal mold unit, shown in FIGS. 7A and 7B, is made up of a fixed metal mold 60A and a movable metal mold 60B. These metal molds 60A, 60B each include a fixed mirror 62 and a movable mirror 67. The resin is injected from a cylinder nozzle 78 through a sprue 65 to a spacing (cavity) surrounded by the fixed mirror 62, movable mirror 67 and by an outer ring 61 to mold a disc substrate 66.

At this time, a stamper 64 for forming a pit or a groove is arranged in the fixed metal mold 60A, so that pits or grooves are simultaneously molded on the disc.

For forming a center hole H shown in FIG. 1, the disc substrate as molded is punched in the metal mold 71 by a gate cut punch 69 having a hydraulic mechanism, not shown.

Figure 3:
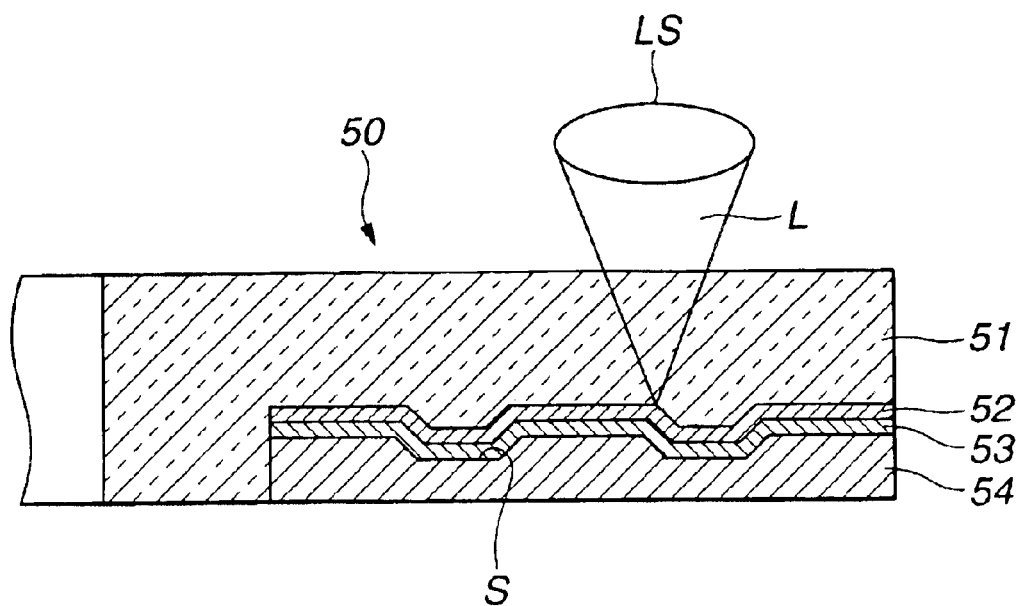
FIG. 3 is a schematic cross-sectional view of an optical disc for recording and/or reproducing by illuminating the light from the substrate side.
Figure 9:
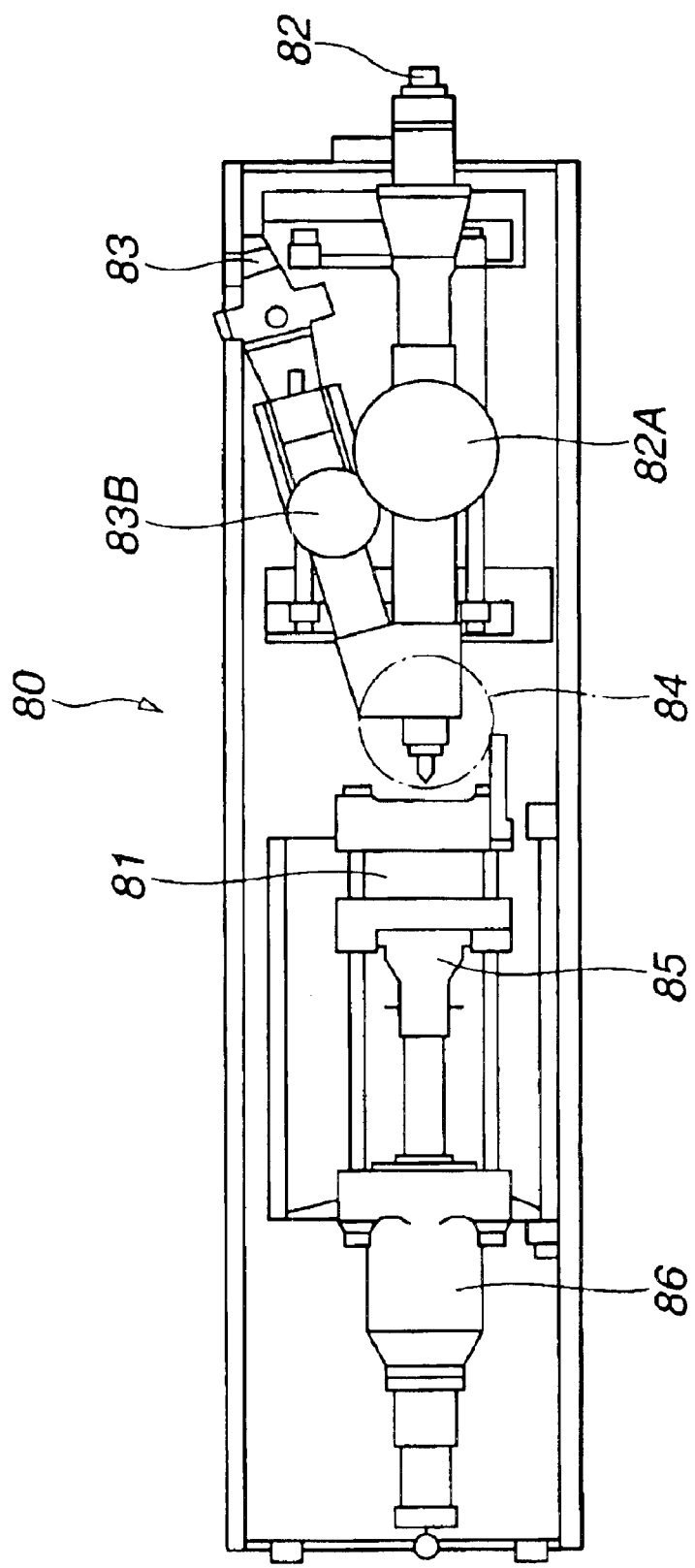
FIG. 9 is a schematic view showing the structure of a two-color molding device.
Figure 10:
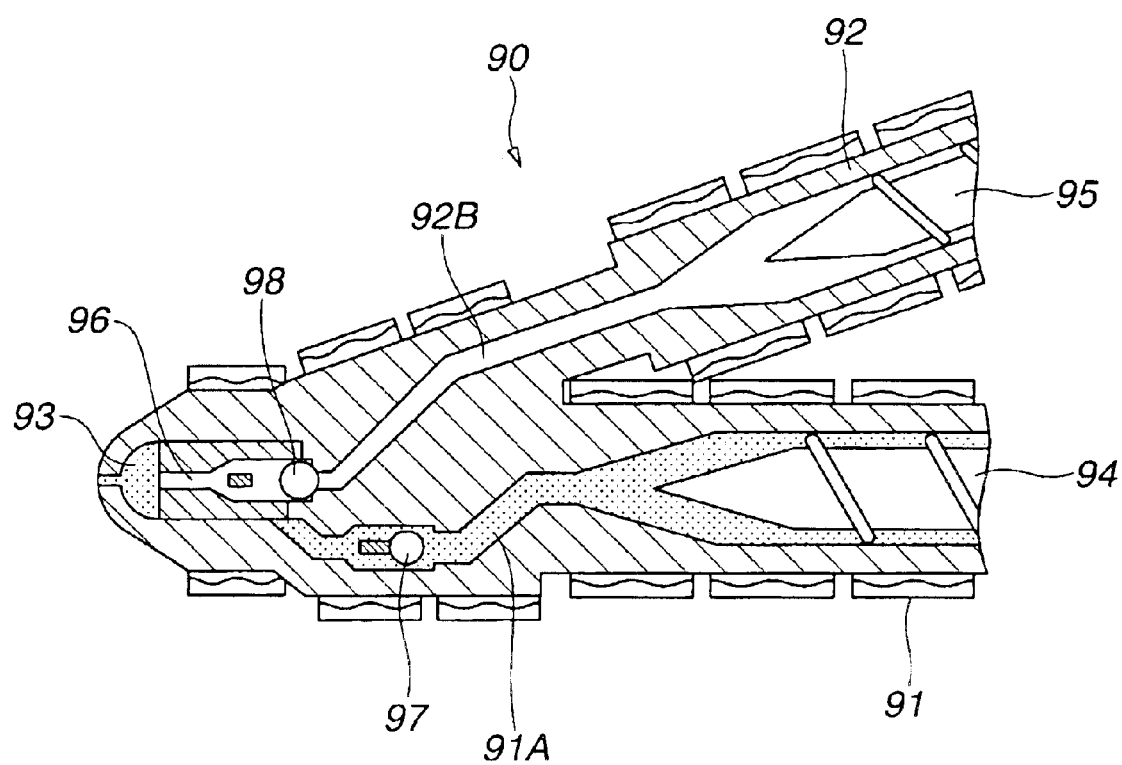
FIG. 10 is a schematic cross-sectional view showing the structure of a two-color molding device.

Referring to FIGS. 9 and 10, a molding device for molding the three-layered substrate 30 shown in FIG. 3 is explained.

FIGS. 9 and 10 shows a so-called two-color molding device 80 and the structure of a nozzle portion thereof, respectively.

Referring to FIG. 9, the two-color molding device 80 includes a metal mold unit 81, an injection unit 82 and another injection unit 83. The injection paths of the injection unit 82 and the injection unit 83 are confluent together at a distal end of the nozzle 84.

Partway in the injection unit 82 is arranged a hopper 82A for a material for the skin layer. Similarly, partway in the injection unit 83 is arranged a hopper 83B for a material for the core layer.

The metal mold unit 81 is the same metal mold as that shown in FIG. 8 and hence is not explained for simplicity.

FIG. 10 shows details of a distal end of the nozzle 90. The distal injection paths of the injection units 82, 83 (a heating cylinder 91 having a screw 94 and a heating cylinder 92 having a screw 95) prove a skin layer resin injection part 93 and a core layer resin injection part 96 which are confluent with each other at the nozzle end 90. Partway in a skin layer resin path 91A and a core layer resin injection path 92B, there are provided check valves 97, 98 configured for preventing the resin back-flowing.

The hopper 82A and the hopper 83B of the two-color molding device of FIG. 9 are fed with a resin for molding the surface layer (skin layer) 34 and with a resin for forming the core layer 35, shown for example in FIG. 4, respectively.

On one surface side of the molded disc substrate, there is formed an information signal surface S, in the form of crests and recesses, for representing information signals S by pits or grooves.

On the substrate made up of the core and skin layers, thus layered together, there is already formed an information signal surface S, in the form of crests and recesses, defined by pits or grooves. So, a light transmitting layer, a recording layer and a light reflecting layer, shown in FIG. 4, are formed sequentially.

EXAMPLE

The present invention is now explained with reference to a numerical example, based on experimental results.

The respective components, stated in the following Tables 1 and 2, are mixed homogeneously, using a tumbler, and prepared into pellets, by a vented twin-screw extruder, with a diameter of 30 mm, manufactured by KOBE STEEL, LTD. under the trade name of KTX-30, as the inside of the extruder is evacuated to as vacuum of 1330 Pa, at a cylinder temperature of 270° C. The resulting pellets are then dried at 120° C. for five hours and formed into a single-layer molded plate for measurement, under a condition of the cylinder temperature of the molding device of 300° C. and a metal mold temperature of 100° C.

Conditions for Measurement
1) water absorption coefficient: The water absorption coefficient was measured of a molded plate prepared pursuant to ASTM D 570, by immersion in water at 23° C. for 24 hours.
2) bending Young's modulus: The bending Young's modulus was measured in accordance with the ASTM D 790.
3) vibration characteristics: A test piece 5 mm in width, 80 mm in length and 1.2 mm in thickness was sliced from the disc by a mechanical resonance measurement method to measure its loss coefficient η.
4) tanδ: Using 983 Dynamic Mechanical Analyzer, manufactured by Du Pont Instruments, pursuant to JIS K 7198, measurement was made of tanδ of a test piece 12.6 mm in length, 63.4 mm in width and 3.2 mm in thickness, at a temperature rising/falling rate of 5° C./min and 18 Hz, and a value obtained at 40° C. was used as tanδ.

Explanation of Materials
PC: polycarbonate resin manufactured by TEIJIN CHEMICALS, LTD. under a trade name of Panlite AD-5503
PMMA: acrylic resin (methyl methacrylate methyl acrylate copolymer manufactured by ASAHI KASEI CORPORATION under the trade name of DELPET 80N)
graphite: flaky graphite (graphite 5098, manufactured by NIPPON SHEET GLASS CO., LTD.). carbon: carbon black (manufactured by DENKI KAGAKU KOGYO KABUSHIKI KAISHA)
whisker: wollastonite (SICATEC NN-4, manufactured by TOMOE ENGINEERING CO., LTD., with a mean particle size D=4 μm and an aspect ratio L/D=20)
elastomer: polyester elastomer manufactured by TEIJIN LTD., under the trade name of TRB-EL1.

Table 1 below shows characteristics of several mixtures of incompatible polycarbonate resin/PMMA resin with variable mixing ratios, as Examples 1 and 2, in comparison with those of respective uncompounded resins.

TABLE 1

| | | | | Ex. 1 | Ex. 2 | Ex. 3 | Comp. Ex. 1 | Comp. Ex. 2 |
|---|---|---|---|---|---|---|---|---|
| composition | A | PC | wt. % | 90 | 70 | 50 | 100 | — |
| | B | PMMA | wt. % | 10 | 30 | 50 | — | 100 |

TABLE 1-continued

|  |  |  | Ex. 1 | Ex. 2 | Ex. 3 | Comp. Ex. 1 | Comp. Ex. 2 |
|---|---|---|---|---|---|---|---|
| characteristics | water absorption coefficient | % | 0.20 | 0.22 | 0.25 | 0.20 | 0.30 |
|  | water absorption coefficient * | % | 0.29 | 0.32 | 0.35 | 0.28 | 0.42 |
|  | bending Young's modulus | MPa | 2250 | 2450 | 2640 | 2150 | 3230 |
|  | tanδ (40° C.) |  |  | 0.028 | 0.044 | 0.060 | 0.004 | 0.085 |

Water absorption coefficient *: measurement by a molded disc article having a thickness of 1.2 mm The PMMA, superior in internal loss and stiffness, has a thermal deformation temperature (ASTM D-648) as low as 100° C. or lower, such that, in an optical disc for recording and/or reproduction, the pits or grooves tend to be thermally deformed due to heat used at the time of laser recording. Moreover, the molded disc is subjected to significant deformation with water absorption, while being vulnerable to shock. So, the PMMA is not used except for a video disc comprised of two PMMA discs, each 1.2 mm in thickness, bonded together.

Figure 11:
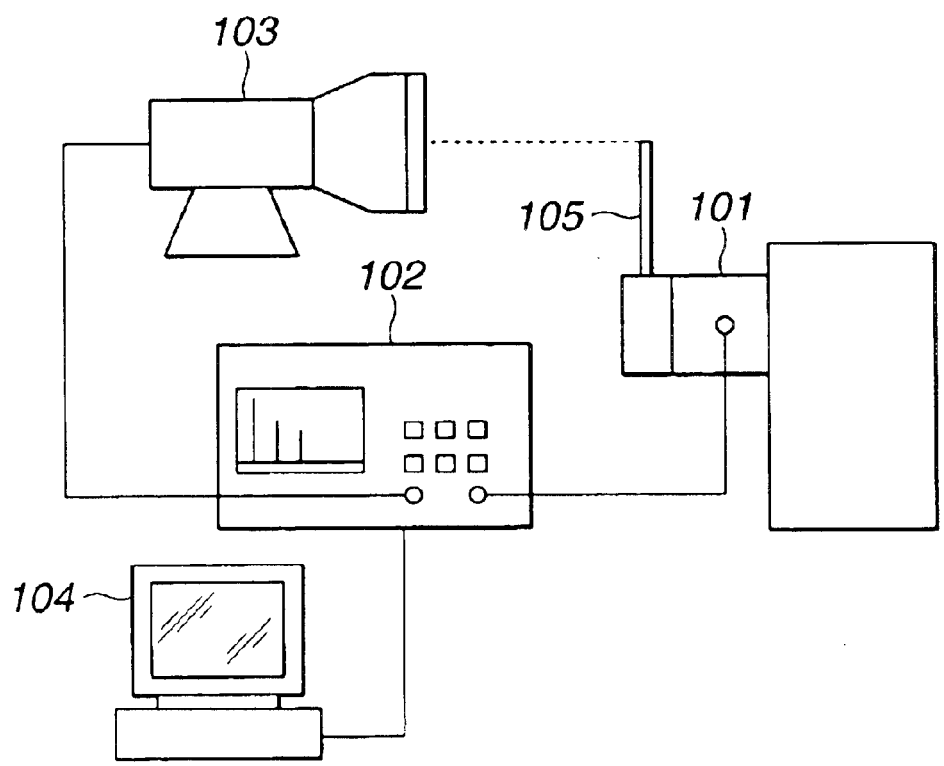
FIG. 11 is a schematic view showing a measurement system by a mechanical resonance method.
Figure 12:
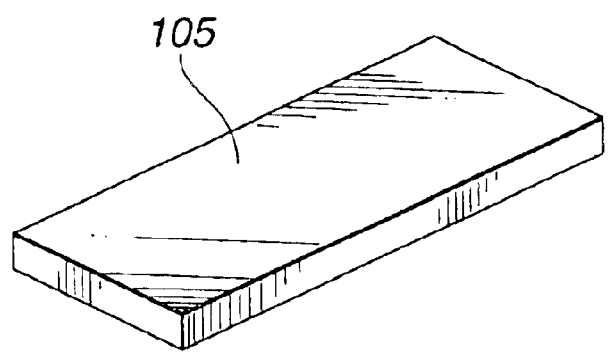
FIG. 12 is a schematic perspective view showing the shape of a test piece.

FIGS. 11, 12 show schematics of the mechanical resonance method and the test piece shape, respectively.

A short strip 5 mm in width and 80 mm in length, serving as a sample 105, was sliced from a disc. The measurement length was set to 60 mm.

As for schematics of measurement, one end of the sample 105 was secured to a piezoelectric actuator 101 shown in FIG. 11. Using a frequency analyzer 102, connected to a controller 104, the oscillation frequency of the actuator 101 was swept. Using a laser Doppler oscillometer (LDV) 103, the rate of oscillation at the free end of the test piece 105 was measured to find the bending resonance frequency.

Figure 13:
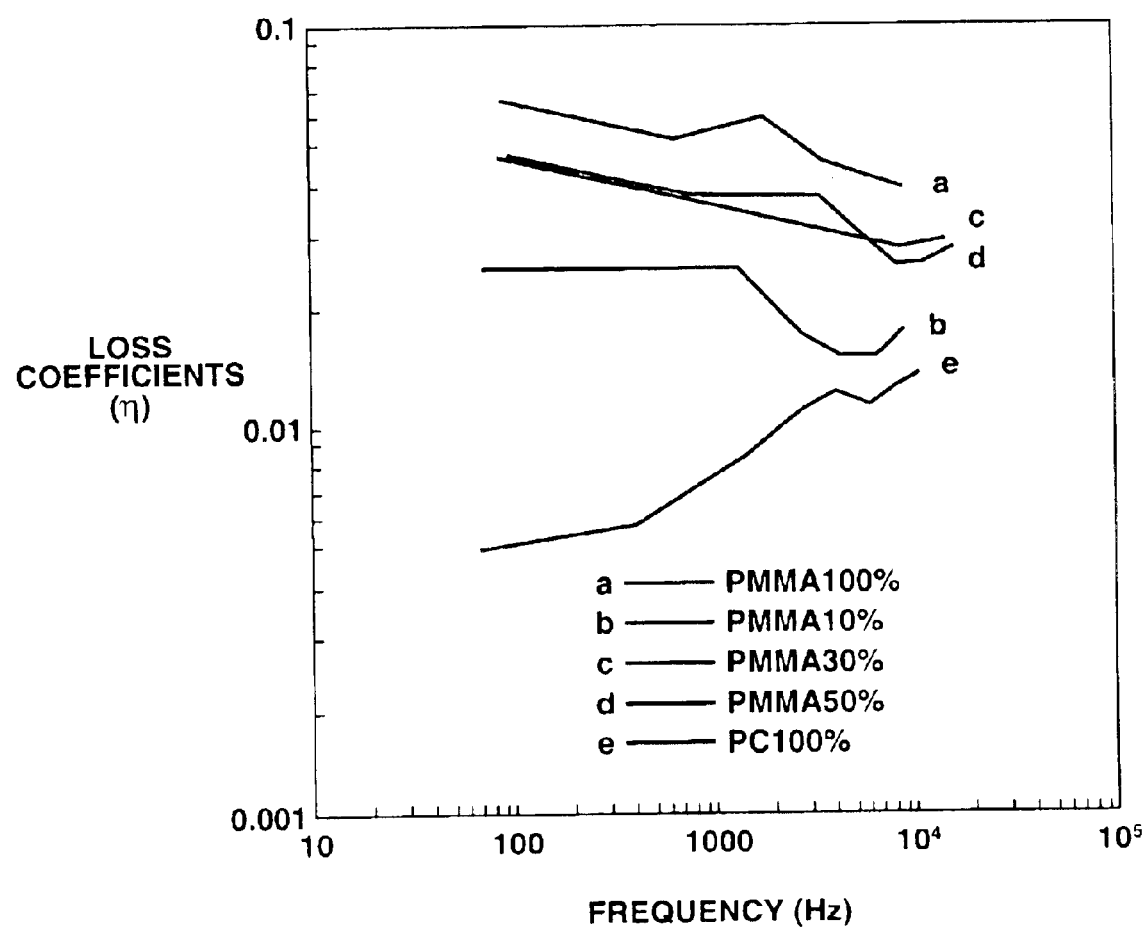
FIG. 13 is a graph showing the relation between the composition of the polycarbonate/polymethyl methacrylate and the loss coefficient.
Figure 14:
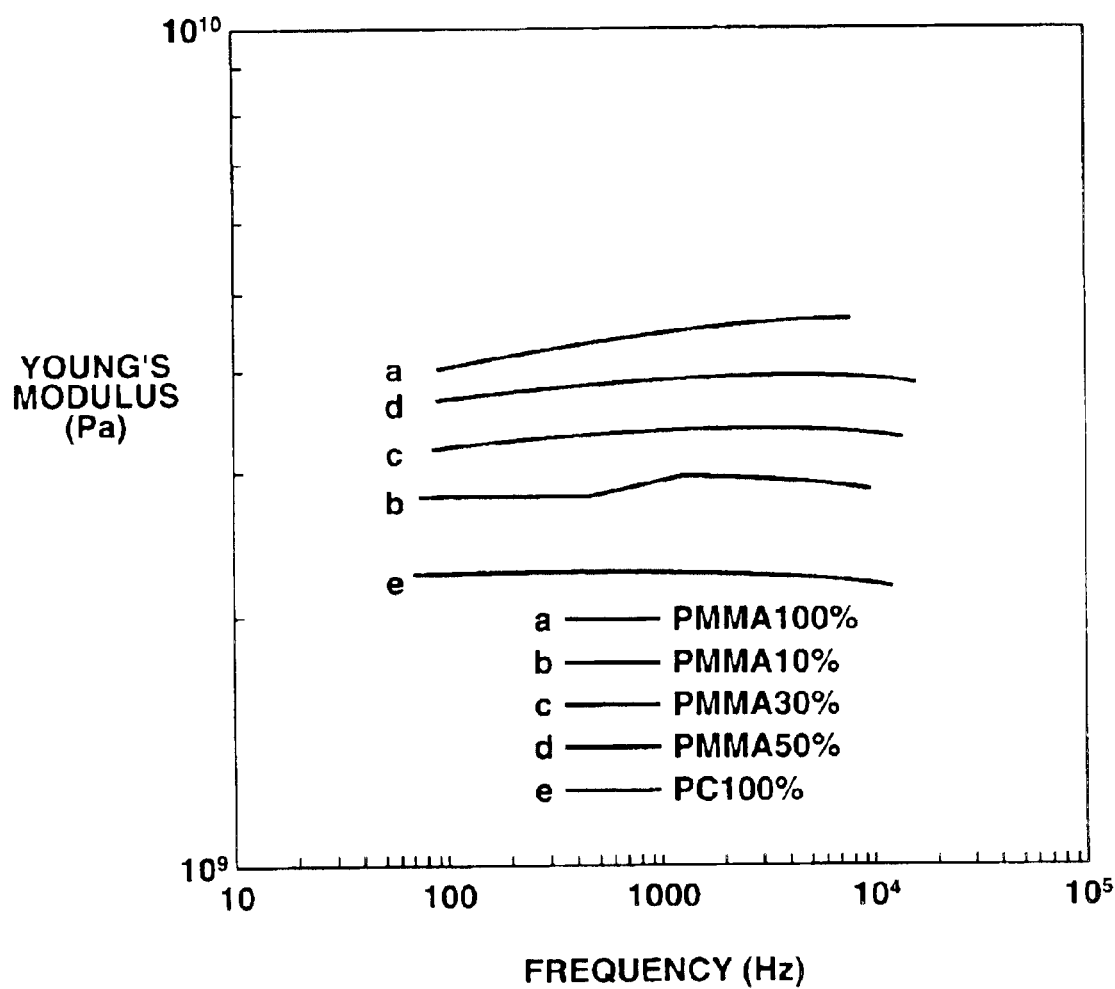
FIG. 14 is a graph showing the relation between the composition of the polycarbonate/polymethyl methacrylate and the bending Young's modulus.
Figure 15:
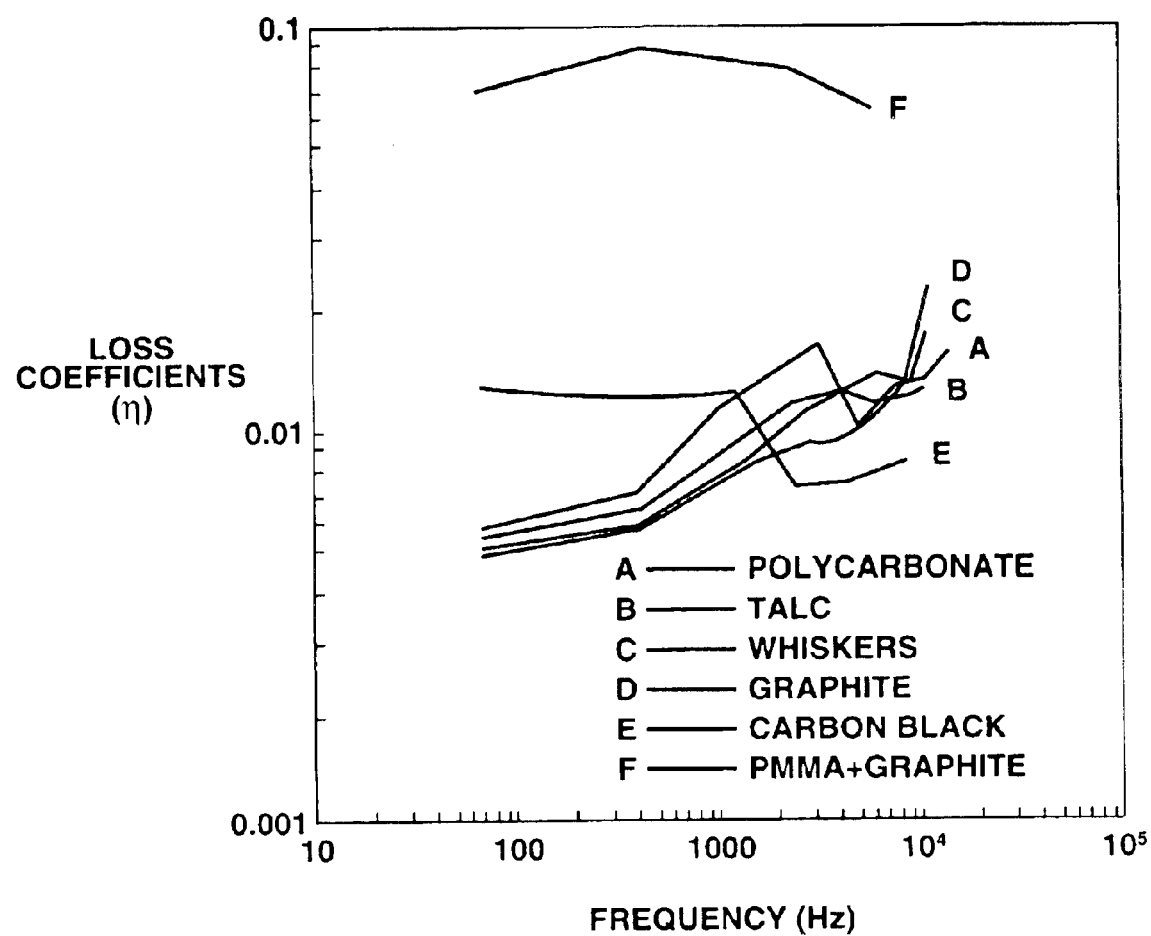
FIG. 15 is a graph showing the relation between the type of the filler material and the loss coefficient.

From the resonance frequency obtained and from the acuity of resonance, the Young's modulus and the loss coefficient η were found and plotted as in FIGS. 13 and 15.

As may be seen from FIG. 13, the loss coefficient η manifests its effect most significantly if the acrylic resin is added in an amount not less than 10%.

As for the Young's modulus, the result of measurement by the ASTM D 790 in the above Table and the result by the mechanical resonance method indicated the same tendency, such that the measure value of the Young's modulus is in meeting with the mixing ratio of the polycarbonate resin an the acrylic resin.

Then, a variety of fillers were added to the polycarbonate resin, as Example 2 and the Comparative Examples 3 to 5, and varied in the mixing ratio for comparison to the uncompounded resin.

Figure 16:
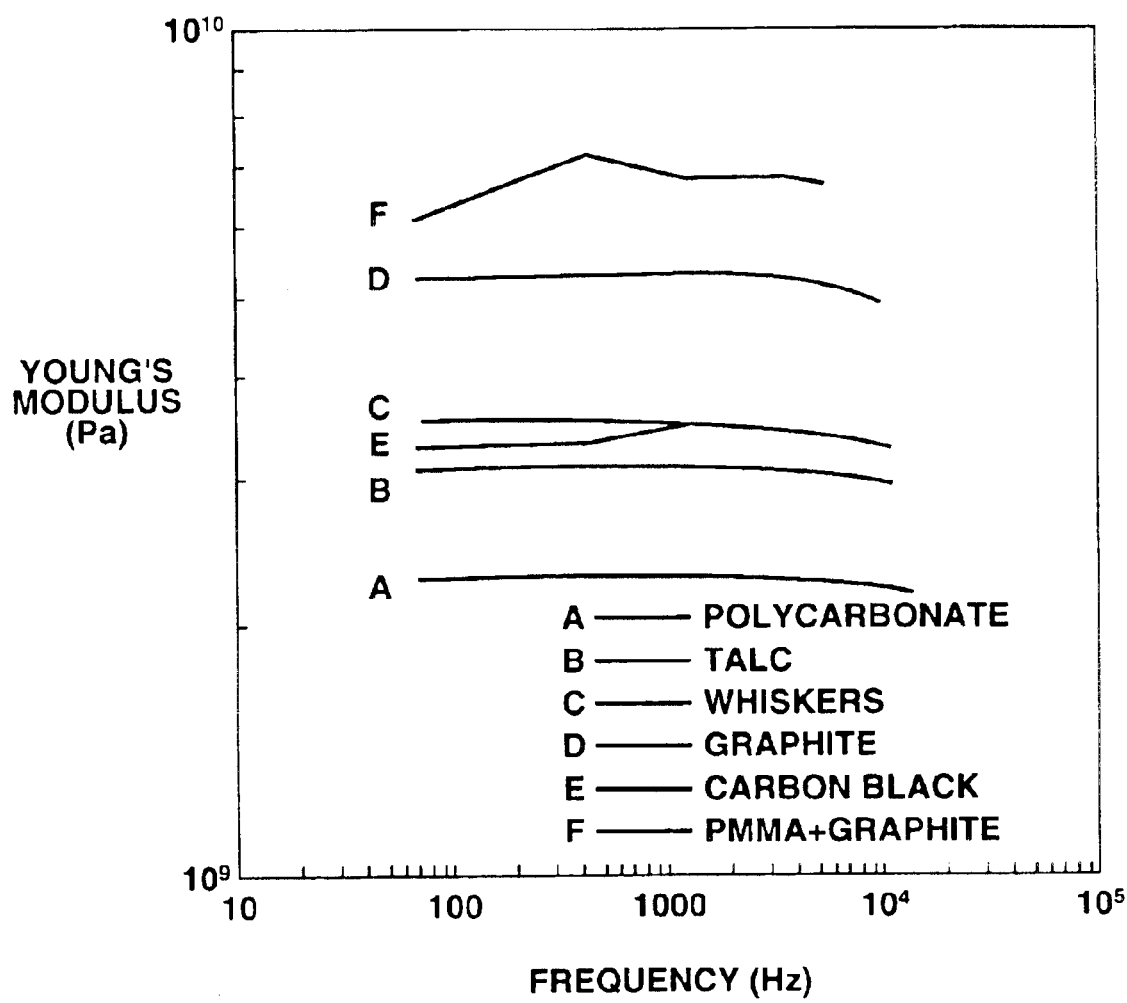
FIG. 16 is a graph showing the relation between the type of the filler material and the bending Young's modulus.

FIGS. 15 and 16 show plotted loss coefficients as found from a vibration test of above examples and plotted Young's modulus, respectively.

As may be seen from FIG. 15, the loss coefficients are increased by addition of graphite as a result of example 4 and 5, whereas the bending Young's modulus of the sole graphite are lower due to interlayer peeling that occurred in disc molding. Conversely, the graphite added to with the acrylic resin exhibits high loss coefficients and superior stiffness.

As for other fillers, the polycarbonate resin, added to with these fillers, is correspondingly improved in stiffness as compared to the uncompounded thermoplastic resin. However, the loss coefficient or the stiffness is not improved in this manner.

Certain embodiments for a three-layered substrate are now explained.

1) A three-layered substrate containing polycarbonate (PC) with a water absorption coefficient of 0.2% in the skin layer and PC/PMMA in the core layer (PMMA, 40 wt %)

As PC and PC/PMMA, the following resins are provided.

PC: AD-5503, manufactured by TEIJIN CHEMICALS, LTD.

PC/PMMA: The aforementioned PC was added to with acrylic resin manufactured by

ASAHI KASEI CORPORATION under the trade name of DELPET 80N, at a mixing ratio of 60:40 and pelletized by a twin-screw extruder.

The PC resin and the PC/PMMA resins were injected into the hoppers 82A, 83B of the two-color molding device of FIG. 9 to produce a three-layered disc containing PC and PC/PMMA in the skin and core layers, respectively, under the following molding conditions:

Molding Conditions metal mold temperature: 125° C.

resin temperature: skin layer, 330° C.; core layer, 300° C.

injection speed: skin layer, 130 mm/sec, core layer, 120 mm/sec cooling rate: 9 sec.

TABLE 2

|  |  |  |  | Ex. 4 | Comp. Ex. 3 | Comp. Ex. 4 | Comp. Ex. 5 | Ex. 5 |
|---|---|---|---|---|---|---|---|---|
| composition | (A) | PC | wt % | 90 | 90 | 85 | 90 | PC 45% PMMA 45% |
|  | (B) | whiskers | wt % | — | 10 | — | — | — |
|  | (C) | graphite | wt % | 10 | — | — | — | 10 |
|  | (D) | carbon black | wt % | — | — | 15 | — | — |
|  | (E) | talc | wt % | — | — | — | 10 | — |
| characteristics |  | specific gravity |  | 1.25 | 1.26 | 1.25 |  | 1.25 |
|  |  | tanδ (40° C.) |  | 0.018 | 0.004 | 0.11 | 0.004 | 0.074 |

Molding Method

First, the skin layer was short-shot in an amount corresponding to approximately 30% of the entire disc weight and subsequently a quantity of the resin corresponding to the core layer was injected within 0.02 to 0.5 second to produce a three-layer disc having a diameter of 120 mm and a thickness of 1.2 mm. The thicknesses of the skin and core layers of the produced disc were as follows:

| | |
|---|---|
| skin layer thickness: | 0.2 mm |
| core layer thickness: | 0.8 mm. |

Figure 18:
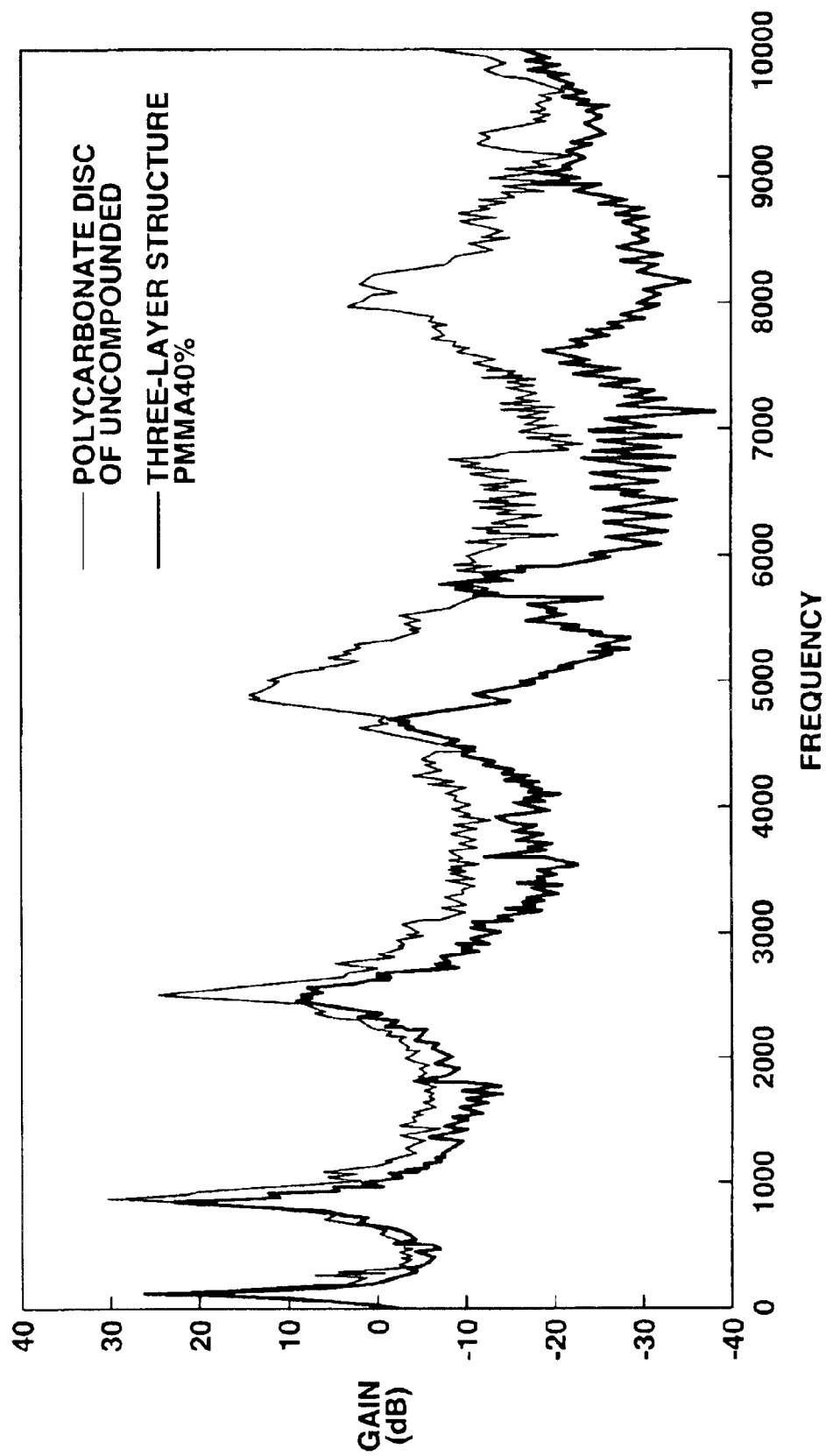
FIG. 18 is a graph showing the results of vibration measurement of a tri-layer structure substrate (PMMA 40 wt %+graphite 10 wt %) in comparison with those of a substrate formed solely of polycarbonate.

FIG. 18 shows the measured results of the vibrations of this three-layer substrate (PMMA 40 wt %) as compared to those of the uncompounded polycarbonate substrate.

2) A three-layered substrate containing polycarbonate (PC) with a water absorption coefficient of 0.12% in the skin layer and polycarbonate added to with graphite in the core layer (PMMA 10 wt %+graphite 10 wt %)

As the PC and a PC/graphite resin, obtained on adding graphite to PC, the following resins were provided:

PC: ST-3000, manufactured by TEIJIN CHEMICALS, LTD.
PC/graphite resin: polycarbonate AD-5503, manufactured by TEIJIN CHEMICALS, LTD., was added to with graphite 5098, manufactured by NIPPON SHEET GLASS CO., LTD., as graphite, were mixed together at a ratio of 90/10 and pelletized by a twin-screw extruder.

The polycarbonate resin (ST-3000) and the PC/graphite resin were charged into the hoppers 82A, 83B of the two-color molding device shown in FIG. 9, respectively, to mold a three-layered disc having a low moisture absorbing polycarbonate and the PC/graphite resin in the skin and core layers, respectively, under the following molding conditions:

Molding Conditions
metal mold temperature: 125° C.
resin temperature: skin layer, 330° C.; core layer, 300° C.
injection speed: skin layer, 130 mm/sec; core layer, 140 mm/sec
cooling rate: 9 sec Molding Method First the skin layer was short-shot in an amount corresponding to approximately 68% of the entire disc weight, and a resin was injected in an amount corresponding to the core layer within 0.02 to 0.5 sec to prepare a three-layer disc having a skin layer of low water absorption coefficient and a core layer having superior resonance characteristics, with the three-layered disc having the diameter of 120 mm and a thickness of 1.2 mm. The thickness of the skin and core layers of the produced disc were as follows:

| | |
|---|---|
| skin layer: | 0.4 mm |
| core layer: | 0.4 mm |

Figure 17:
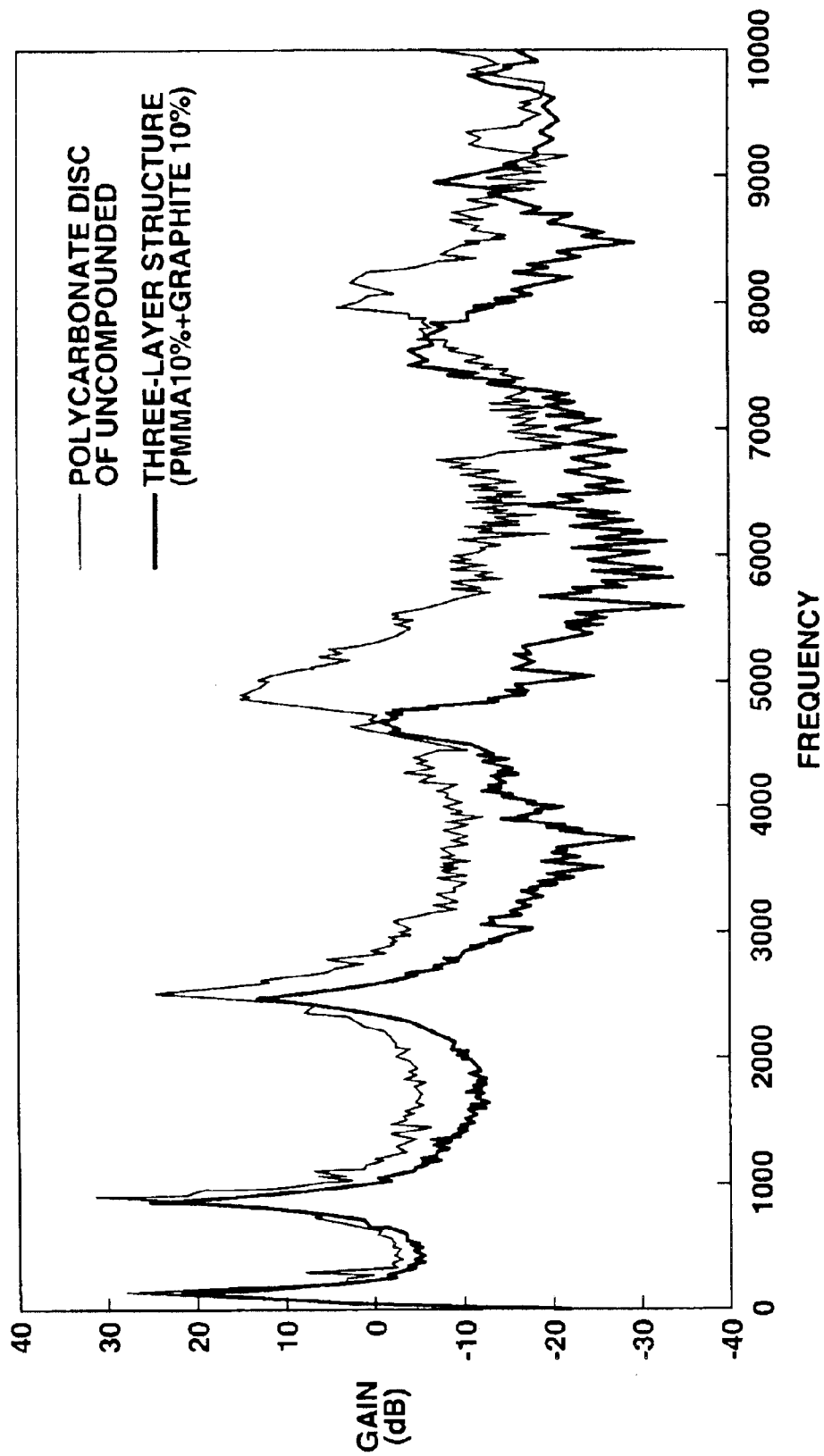
FIG. 17 is a graph showing the results of vibration measurement of a tri-layer structure substrate (PMMA 10 wt %+graphite 10 wt %) in comparison with those of a substrate formed solely of polycarbonate.

FIG. 17 shows the measured results of the vibrations of this three-layered substrate (PMMA 10 wt %+graphite 10 wt %) in comparison with those of the uncompounded polycarbonate substrate.

The vibrations were measured by substituting a disc substrate itself for a test piece and by substituting a vibrator for the piezoelectric actuator in a principle diagram for vibration measurement shown in FIG. 11. Measurement was made at three points on the outer periphery of the disc (R=58 mm) thirty times at each point to find an average value.

In FIGS. 17 and 18, as the gain on the ordinate (dB) is increased in the minus direction from zero, the resonance characteristics become higher, whereas, the lesser the gain above zero, and the lesser the gain peak for the same frequency, the higher become the resonance characteristics achieved.

So, it is seen from FIGS. 17 and 18 that, with the PMMA+graphite-based three layer substrate, resonance characteristics are superior over a broad frequency range in comparison with those of the substrate of uncompounded polycarbonate.

The effect of addition of the electrically conductive carbon black was also checked, as a result of which it was seen that, by adding 15 wt % of the electrically conductive carbon black, the surface specific resistance of the disc substrate (volumetric resistivity: unit Ωcm) was decreased from $10^{-15}$ to $10^{-10}$, and hence deposition of contaminants was eliminated by the electrification preventative effect to improve the error rate.

Since resonance characteristics of a disc substrate, which could be discounted with the CD or DVD, were improved, at the same time as the stiffness could be maintained, a high NA disc substrate could be prepared.

Since the superficial layer of the disc substrate was formed by resin having superior signal transcription characteristics and good water absorption characteristics and the core layer is formed by the resin having superior stiffness and resonance characteristics, it is possible to suppress the warping of the disc caused by water absorption in the using or storage environment with differing temperature or humidity thus realizing a disc substrate of high reliability even for a shallow depth of focus of a high NA disc.

What is claimed is:

1. An optical recording medium in which at least a recording layer and a light transmitting layer are sequentially formed on a substrate and in which the light is illuminated from the light transmitting layer side for recording and/or reproducing information signals, wherein said substrate has at least a surface layer (skin layer) and a core layer, said core layer having an internal loss tanδ of not less than 0.015 as measured at 40° C. at 18 Hz pursuant to JIS K 7198.

2. The optical recording medium according to claim 1 wherein said core layer is a resin composition comprised of a mixture of two or more resins.

3. The optical recording medium according to claim 2 wherein said resin composition is an incompatible composite resin material; and wherein said core layer is of an islands-sea structure.

4. An optical recording medium in which at least a recording layer and a light transmitting layer are sequentially formed on a substrate and in which the light is illuminated from the light transmitting layer side for recording and/or reproducing information signals, wherein said substrate has at least a surface layer (skin layer) and a core layer, said core layer having an internal loss tanδ of not less than 0.015 as measured at 40° C. at 18 Hz pursuant to JIS K 7198, wherein said core layer is a resin composition comprised of a mixture of two or more resins, wherein said resin composition is comprised of 50 to 90 wt% of an amorphous thermoplastic resin (component A) and a methyl methacrylate based resin (component B).

5. The optical recording medium according to claim 3 wherein said resin composition is comprised of 50 to 90 wt% of an amorphous thermoplastic resin (component A) and a methyl methacrylate based resin (component B).

6. The optical recording medium according to claim 4 wherein said component A is an aromatic polycarbonate resin.

7. The optical recording medium according to claim 5 wherein said component A is an aromatic polycarbonate resin.

8. The optical recording medium according to claim 1 wherein said core layer is comprised of the resin composition and a filler.

9. The optical recording medium according to claim 8 wherein said filler is graphite added in an amount of 5 to 15 wt% to said resin composition.

10. The optical recording medium according to claim 1 wherein said substrate is of a structure of three or more layers comprised of the core layer sandwiched by surface layers each of which is a resin layer having the water absorption coefficient of not larger than 0.20% as measured under a condition of immersion in water at 23° C. for 24 hours pursuant to ASTM D 570.

11. The optical recording medium according to claim 2 wherein said resin composition is comprised of 50 to 90 wt% of an amorphous thermoplastic resin (component A) and a methyl methacrylate based resin (component B).

12. The optical recording medium according to claim 11 wherein said component A is an aromatic polycarbonate resin.

* * * * *